(12) United States Patent
Ito et al.

(10) Patent No.: US 9,833,890 B2
(45) Date of Patent: Dec. 5, 2017

(54) ELECTRIC TOOL AND COMMUNICATION PLUG FOR ELECTRIC TOOL

(75) Inventors: Tatsuya Ito, Ibaraki (JP); Tomomasa Nishikawa, Ibaraki (JP); Hironori Mashiko, Ibaraki (JP); Mizuho Nakamura, Ibaraki (JP); Yoshio Iimura, Ibaraki (JP)

(73) Assignee: HITACHI KOKI CO., LTD., Tokyo (JP)

(*) Notice: Subject to any disclaimer, the term of this patent is extended or adjusted under 35 U.S.C. 154(b) by 862 days.

(21) Appl. No.: 13/474,914

(22) Filed: May 18, 2012

(65) Prior Publication Data

US 2012/0292070 A1 Nov. 22, 2012

(30) Foreign Application Priority Data

May 19, 2011 (JP) .................................. 2011-112930
Dec. 18, 2011 (JP) .................................. 2011-276547

(51) Int. Cl.
*B25F 5/00* (2006.01)
*H02K 5/22* (2006.01)
*B25B 21/02* (2006.01)
*H02K 11/33* (2016.01)
*H02K 11/35* (2016.01)

(52) U.S. Cl.
CPC ............... *B25F 5/00* (2013.01); *B25B 21/02* (2013.01); *H02K 5/225* (2013.01); *H02K 11/33* (2016.01); *H02K 11/35* (2016.01)

(58) Field of Classification Search
CPC ............ B25F 5/00; B25B 21/00; B25B 23/14
See application file for complete search history.

(56) References Cited

U.S. PATENT DOCUMENTS

| | | | | |
|---|---|---|---|---|
| 6,218,806 | B1* | 4/2001 | Brotto et al. | 320/106 |
| 6,913,087 | B1* | 7/2005 | Brotto et al. | 173/1 |
| 7,011,247 | B2* | 3/2006 | Drabczuk et al. | 235/451 |
| 7,197,373 | B2* | 3/2007 | Fiebig et al. | 700/168 |
| 7,311,025 | B1 | 12/2007 | Wilson, Jr. | |
| 7,330,129 | B2* | 2/2008 | Crowell et al. | 340/815.4 |
| 7,346,422 | B2* | 3/2008 | Tsuchiya et al. | 700/168 |
| 8,084,901 | B2* | 12/2011 | Oomori et al. | 310/50 |
| 2003/0011245 | A1* | 1/2003 | Fiebig | 307/48 |
| 2003/0093609 | A1 | 5/2003 | Drabczuk et al. | |

(Continued)

FOREIGN PATENT DOCUMENTS

| CN | 1418349 A | 5/2003 |
|---|---|---|
| CN | 1651197 A | 8/2005 |

(Continued)

OTHER PUBLICATIONS

Chinese Office Action for the related Chinese Patent Application No. 201210158891.4 dated Aug. 13. 2014.

(Continued)

*Primary Examiner* — Andrew M Tecco
(74) *Attorney, Agent, or Firm* — Kenealy Vaidya LLP

(57) ABSTRACT

An electric tool including: a motor configured to drive a front end tool; a control device configure to control rotation of the motor; a storage part configured to store a method of driving the motor by the control device; and a communication terminal to which a communication line for reading or writing information of the storage part is configured to be connected.

15 Claims, 20 Drawing Sheets

(56) References Cited

U.S. PATENT DOCUMENTS

| | | |
|---|---|---|
| 2003/0182016 A1 | 9/2003 | Fiebig et al. |
| 2005/0011655 A1 | 1/2005 | Crowell et al. |
| 2006/0142894 A1 | 6/2006 | Tsuchiya et al. |
| 2010/0001017 A1 | 1/2010 | Herman et al. |
| 2010/0090528 A1* | 4/2010 | Makwinski ............... G06F 1/26 307/31 |
| 2010/0186976 A1* | 7/2010 | Tsubakimoto .......... B25B 21/02 173/47 |
| 2011/0067895 A1* | 3/2011 | Nobe et al. ..................... 173/20 |

FOREIGN PATENT DOCUMENTS

| | | | |
|---|---|---|---|
| CN | 1700971 A | | 11/2005 |
| CN | 1722189 A | | 1/2006 |
| CN | 101247491 A | | 8/2008 |
| EP | 2 025 475 A2 | | 2/2009 |
| JP | 2003-305668 A | | 10/2003 |
| JP | 2004-234861 | | 8/2004 |
| JP | 2005-169533 A | | 6/2005 |
| JP | 2005-212097 A | | 8/2005 |
| JP | 2006-294349 A | | 10/2006 |
| JP | 2008-307664 A | | 12/2008 |
| JP | 2009-83043 A | | 4/2009 |
| JP | 2009-117117 | | 5/2009 |
| JP | 2009-196024 A | | 9/2009 |
| JP | 2009-220214 A | | 10/2009 |
| JP | 2009-279683 A | | 12/2009 |

OTHER PUBLICATIONS

Japanese Office Action for the related Japanese Patent Application No. 2011-276547 dated Mar. 27, 2015.
Blind rivet setting tool BNS-2009 2010 2013.
CP Desoutter E-Lit cordless tools by Lou Zampini & Associates.
Desoutter, Impressona Franca em Fevereiro de 208 Edicao 1.
MM Motek daily, Maschinenmarkt, Sep. 24, 2007.
Japanese Opposition for the related Japanese Patent No. 5796741 dated Apr. 14, 2016.
The notification of reason of cancellation for the related Japanese Patent No. 5796741 dated Jan. 17, 2017.
Japanese Written Opinion for the related Japanese Patent No. 5796741 dated Dec. 8, 2016.
The transmittal notification of Japanese Written Opinion for the related Japanese Patent No. 5796741 dated Jan. 17, 2017.

* cited by examiner

ELECTRIC TOOL AND COMMUNICATION PLUG FOR ELECTRIC TOOL

CROSS-REFERENCE TO RELATED APPLICATIONS

This application claims priority from Japanese Patent Application No. 2011-112930 filed on May 19, 2011 and Japanese Patent Application No. 2011-276547 filed on Dec. 18, 2011, the entire contents of which are incorporated herein by reference.

TECHNICAL FIELD

Aspects of the present invention relate to an electric tool which is driven by a motor to rotate a front end tool, and particularly provides a means for changing a program of an electric tool which performs control according to a program by using a micro computer. Further, aspects of the present invention provide a communication plug which is connected to an electric tool.

BACKGROUND

Recently, brushless DC motors have been widely used as drive sources of electric tools. Each of the brushless DC motors is, for example, a direct-current (DC) motor with no brush (brush for rectification), and uses a coil (winding) and a magnet (permanent magnet) on the stator side and on the rotator side, respectively, and sequentially supplies power driven by an inverter circuit to predetermined coils such that a rotor rotates. The inverter circuit is configured by using a high-capacity output transistor such as a field-effect transistor (FET) or an insulated gate bipolar transistor (IGBT), and is controlled according to a program executed by a micro computer. The brushless DC motors have features in which they are more superior in a torque characteristic as compared to DC motors with brushes, and thus can tighten screws, bolts, and the like against work pieces with a stronger force. Further, since the brushless DC motors use micro computers to control rotation of motors, they can implement various control patterns according to programs executed by the micro computers.

As an example of impact tools using brushless DC motors, there is known a technology of JP-A-2008-307664, for instance. In JP-A-2008-307664, a continuously rotating type striking mechanism unit is provided, and if a torque is given to a spindle through a power transmission mechanism unit (deceleration mechanism unit), a hammer engaged with the spindle to be movable in the rotation axis direction of the spindle rotates so as to rotate an anvil abutting on the hammer. Each of the hammer and the anvil has two convex hammer portions (striking portions) symmetrically disposed at two positions on a rotary plane, and the convex portions of the hammer and the convex portions of the anvil are positioned such that the convex portions of the hammer are engaged with the convex portions of the anvil in a rotation direction, and a rotary striking force is transmitted by the engagement of the convex positions. The hammer is swingable in an axial direction with respect to a spindle in a ring area surrounding the spindle. At the inner circumferential surface of the hammer, a cam groove is provided in an inverted "V" shape (almost a triangular shape). At the outer circumferential surface of the spindle, a cam groove is provided in a "V" shape in the axial direction. The hammer rotates through balls (metal balls) inserted between the cam groove of the outer circumferential surface and the cam groove of the inner circumferential surface of the hammer.

SUMMARY

Since the electric tools according to the related art perform rotation control on their motors according to programs, it becomes possible to make the electric tools perform operations required by individual customers by rewriting the programs. However, since the programs are stored in non-volatile memories mounted inside or outside micro computers in advance and then are shipped from factories, it is substantially impossible to change the programs after the shipment.

The present invention was made in view of the above-mentioned background, and an object of the present invention is to provide an electric tool which allows a computer program for driving a motor or a control parameter to be changed through an external device.

Another object of the present invention is to implement an electric tool having a communication terminal for connection with a personal computer or the like.

Another object of the present invention is to implement an electric tool which can prevent short-circuiting between terminals and has a waterproof and dustproof communication terminal.

Another object of the present invention is to provide a communication plug for an electric tool which makes it possible to easily determine a connection direction of the communication plug and an electric tool, and is user-friendly.

Another object of the present invention is to provide a versatile communication plug which can be widely connected even to electric tools using batteries different in their standards.

Another object of the present invention is to provide a communication plug which can distribute a load on a communication terminal at the time of connection of the communication plug and an electric tool.

Another object of the present invention is to provide a communication plug which makes it easy to confirm whether power is being input and is correctly operating.

The features of representative some of inventions to be disclosed in the present specification are as follows.

According to an aspect of the invention, there is provided an electric tool including: a motor configured to drive a front end tool; a control device configure to control rotation of the motor; a storage part configured to store a method of driving the motor by the control device; and a communication terminal to which a communication line for reading or writing information of the storage part is configured to be connected.

According to another aspect of the invention, there is provided a communication plug connected to an electric tool including a control device, a storage part and a communication terminal for reading or writing information stored in the storage part from the outside, the communication plug including: a housing: a base plate that is mounted in the housing: a plug that is fixed to the base plate, protrudes outward from the housing, and is configured to be connected to the communication terminal; and a connection terminal for connecting the base plate and an external connection device, wherein the plug has a shape such that its connection direction is limited to a specific direction, and wherein a converter configured to perform conversion between a protocol for communication with the electric tool and a protocol for communication with the external connection device is provided to the base plate.

According to another aspect of the invention, there is provided an electric tool including: a control device; a storage part; and a USB connector for reading or writing information from an external personal computer, wherein the control device can be operated by power supplied from the personal computer through the USB connector, wherein the USB connector and the control device are connected such that a power supply line is disposed to supply power to a signal pin different from that for a USB protocol, and wherein the control device operates by the supplied power when the control device is connected to the personal computer.

DETAILED DESCRIPTION

First Embodiment

Hereinafter, embodiments of the present invention will be described with reference to the accompanying drawings. In the following description, an upper side, a lower side, a front side, and a rear side will be described with reference to directions shown in FIG. 1.

Figure 1:
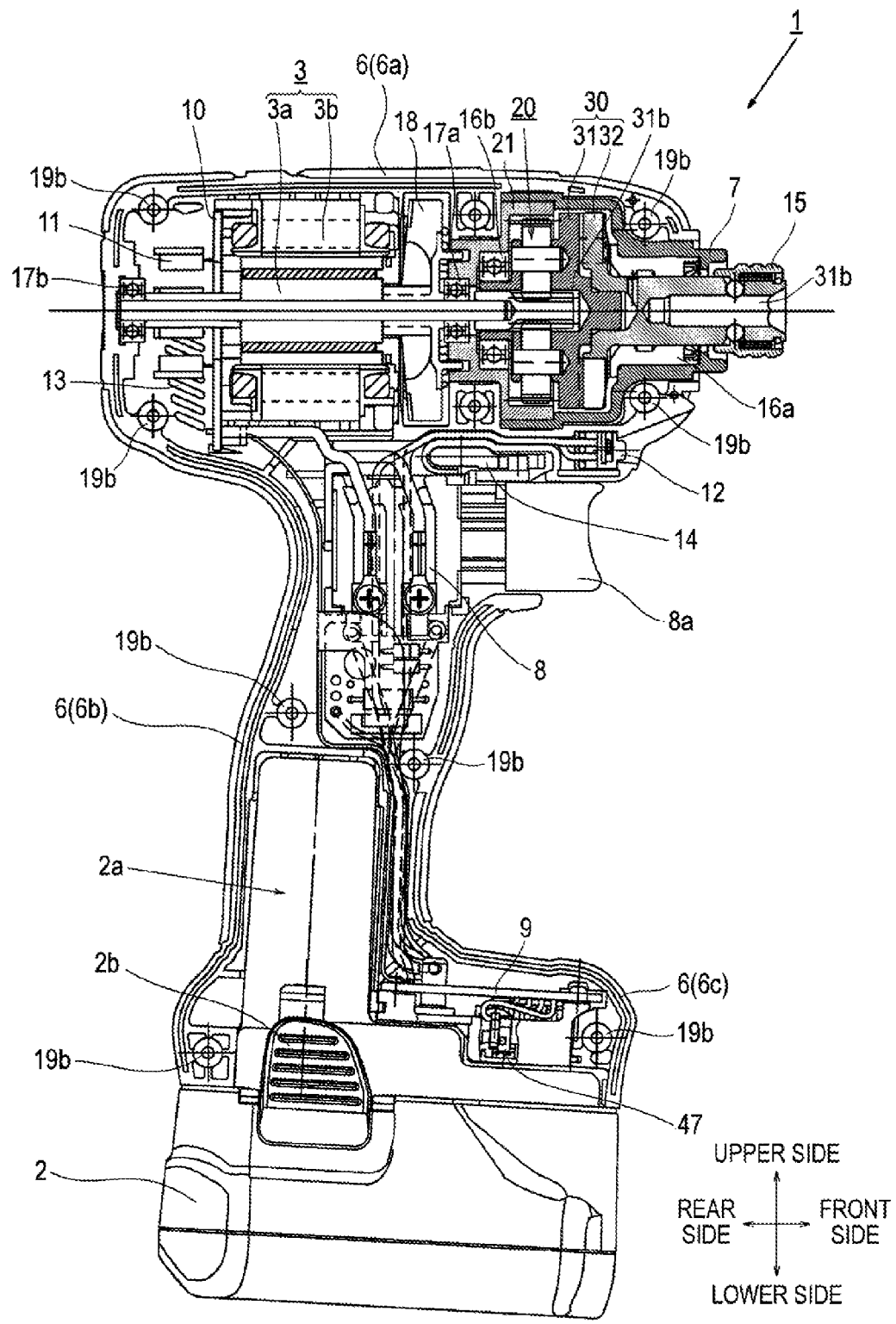
FIG. 1 is a longitudinal sectional view illustrating the entire structure of an electric tool 1 according to an embodiment of the present invention.

FIG. 1 is a longitudinal sectional view illustrating the entire structure of an electric tool 1 according to an embodiment of the present invention. The electric tool 1 uses a chargeable battery pack 2 as a power supply, uses a motor 3 as a drive source to drive a striking mechanism 30 to apply a torque or/and a striking force to an anvil 32 serving as an output shaft, thereby transmitting a continuous torque or an intermittent striking force to a front end tool (not shown) such as a driver bit such that a processing such as a screw tightening or a bolt tightening is performed.

The motor 3 is of a brushless DC motor type, and includes a stator 3b and a rotator 3a which includes a permanent magnet and rotates inside the stator 3b. The motor 3 is placed in a substantially cylindrical body portion 6a of a housing 6 which is almost a 'T' shape in a lateral view, such that an axial direction of a rotation shaft 4 coincides with a front-rear direction. The housing 6 is configured to be capable of being divided into two members, i.e. left and right members which are almost symmetric, and these members are fixed by a plurality of screws (not shown). For this reason, at one of the left and right members of the housing 6 (the left housing in the present embodiment), a plurality of screw bosses 19b is formed, and at the other of the left and right members (the right housing) (not shown), a plurality of screw holes is formed. The rotation shaft 4 of the motor 3 is held by a bearing 17b provided on the rear end side of the body portion 6a and a bearing 17a provided in the vicinity of the central portion of the body portion 6a such that the rotation shaft 4 is rotatable. At the rear of the motor 3, an inverter board 10 having six switch elements 11 mounted thereon is provided. The inverter board 10 is an annular multi-layer board having almost the same diameter as that of the outline of the motor 3. On the rear surface of the inverter board 10 (surface on the rear side), the six switch elements 11 such as field-effect transistors are mounted. On the front surface of the inverter board 10 (surface on the front side), at a position facing the permanent magnet of the rotator 3a, a rotation-position detecting element (not shown) such as a Hall IC for detecting the position of the rotator is mounted.

A handle portion 6b is formed integrally with the body portion 6a of the housing 6 to extend from the body portion 6a downward in a substantially perpendicular direction. At an upper portion in the handle portion 6b, a trigger manipulation portion 8a and a forward/reverse rotation switch lever 14 are provided. The trigger manipulation portion 8a is provided to a trigger switch 8 such that the trigger manipulation portion 8a is biased by a spring (not shown), thereby protruding from the handle portion 6b. Below the trigger switch 8, a switch board is provided. Further, the front end side of the body portion 6a is connected to a hammer case 7 below which an LED light 12 is provided. The LED light 12 irradiates the vicinity of the front end of a bit serving as the front end tool (not shown) with light when the bit is fitted into a fitting hole 31b.

Below the handle portion 6b, a battery holding portion 6c is provided and accommodates a control circuit board 9 having a control circuit, which has a function of controlling the speed of the motor 3 in response to pulling manipulation on the trigger manipulation portion 8a, and the like.

The battery pack 2 accommodating a plurality of battery cells such as nickel-metal hydrogen cells or lithium-ion cells is detachably fit into the battery holding portion 6c of the housing 6 formed below the handle portion 6b. The battery pack 2 includes an extending portion 2a to extend up to the inside of the handle portion 6b of the housing 6, and has almost an "L" shape in a lateral view like FIG. 1. The battery pack 2 includes release buttons 2b positioned at its left and right sides. A user can move the battery pack 2 downward while pushing the release buttons 2b, thereby detaching the battery pack 2 from the battery holding portion 6c.

In front of the motor 3, a cooling fan 18 is attached to the rotation shaft 4 so as to be rotatable in sync with the motor 3. The cooling fan 18 is a centrifugal fan for sucking air in the vicinity of the rotation shaft 4 regardless of its rotation direction and discharging the air outward in a radial direction, and sucks air from an air intake 13a provided at a side of the body portion 6a on the rear side. The air sucked into the housing 6 passes between the rotator and stator of the motor and between the magnetic poles of the stator, reaches the cooling fan 18 and is discharged to the outside of the housing 6 from a plurality of air outlets (see FIG. 2 to be described below) formed in the vicinity of the outer circumference side in the radial direction of the cooling fan 18.

The striking mechanism 30 and a decelerating mechanism 20 constitute a power transmitting mechanism of the electric tool 1. The striking mechanism 30 mainly includes two components, i.e. the anvil 32 and a planetary carrier assembly 31. The planetary carrier assembly 31 links rotation shafts of planetary gears of the decelerating mechanism 20 and includes a hammer (to be described below) for striking the anvil 32. The decelerating mechanism 20 according to the present embodiment is of a planetary type, has one decelerating mechanism unit, and includes a sun gear, a plurality of planetary gears, and a ring gear. Unlike known striking mechanisms in widespread use nowadays, the striking mechanism 30 does not have a cam mechanism including a spindle, a spring, cam grooves, balls, and the like. Further, the anvil 32 and the planetary carrier assembly 31 are coupled by a fitting shaft and a fitting hole formed in the vicinities of their rotation centers, such that only relative rotation of a half turn or less is possible. The anvil 32 is formed integrally with an output shaft portion for fitting the front end tool (not shown). At the front end of the anvil 32, the fitting hole 31b is formed such that the shape of a section in a plane perpendicular to the axial direction is hexagonal. Also, the anvil 32 and the output shaft for fitting the front end tool may be configured by separate components and be coupled. The rear side of the anvil 32 is coupled with the fitting shaft of the planetary carrier assembly 31, and is held by a metal 16a in the vicinity of the center in the axial direction such that the anvil 32 is rotatable with respect to the hammer case 7. At the front end of the anvil 32, a sleeve 15 for mounting or dismounting the front end tool with one touch is provided.

In order to accommodate the striking mechanism 30 and the decelerating mechanism 20, the hammer case 7 is integrally formed of a metal, and is mounted in the front side of the housing 6. The hammer case 7 is for holding the anvil 32 through a bearing mechanism, and the entire hammer case 7 is covered by the housing 6 separable into the left and right components such that the hammer case 7 is fixed.

If the trigger manipulation portion 8a is pulled such that the motor 3 is activated, the rotation of the motor 3 is decelerated by the decelerating mechanism 20, and the planetary carrier assembly 31 rotates at a speed of rotation having a predetermined rate with respect to the speed of rotation of the motor 3. If the planetary carrier assembly 31 rotates, its torque is transmitted to the anvil 32 through the hammer provided to the planetary carrier assembly 31, such that the anvil 32 starts rotating at the same speed as that of the planetary carrier assembly 31. If a force acting on the anvil 32 increases according to a reaction force received from the front end tool side, a control device (to be described below) detects an increase in a tightening reaction force, and changes the drive mode of the planetary carrier assembly 31 before the rotation of the motor 3 stops so as to be locked. In this way, the control device intermittently drives the hammer.

At the inside of the body portion 6a, an inner cover 21 is provided in front of the cooling fan 18. The inner cover 21 is a member integrally formed of a synthetic resin such as plastic, and is attached along the inner wall of the housing. On the rear side of the inner cover 21, a cylindrical portion is formed. This cylindrical portion holds the outer ring of the bearing 17a for fixing the rotation shaft 4 of the motor 3 such that the rotation shaft 4 is rotatable. Further, on the front side of the inner cover 21, a cylindrical portion having two different diameters is provided stepwise. A bearing 16b is provided in the rear small inside-diameter portion, and a ring gear is accommodated in a front large inside-diameter portion. The inner cover 21 is inserted into the hammer case 7 from a rear opening of the hammer case 7, and the decelerating mechanism 20 and the striking mechanism 30 are accommodated in a space defined by the inner cover 21 and the hammer case 7. Therefore, it is possible to efficiently prevent grease or the like for lubrication from flowing to the outside, and it is possible to stably operate the decelerating mechanism and the striking mechanism over a long period. Further, although the decelerating mechanism 20 is configured by the planetary gears in the present embodiment, the number of stages of planetary gears is not limited thereto. The planetary gears may be arranged in two or three stages so as to increase a speed reduction ratio.

Figure 2:
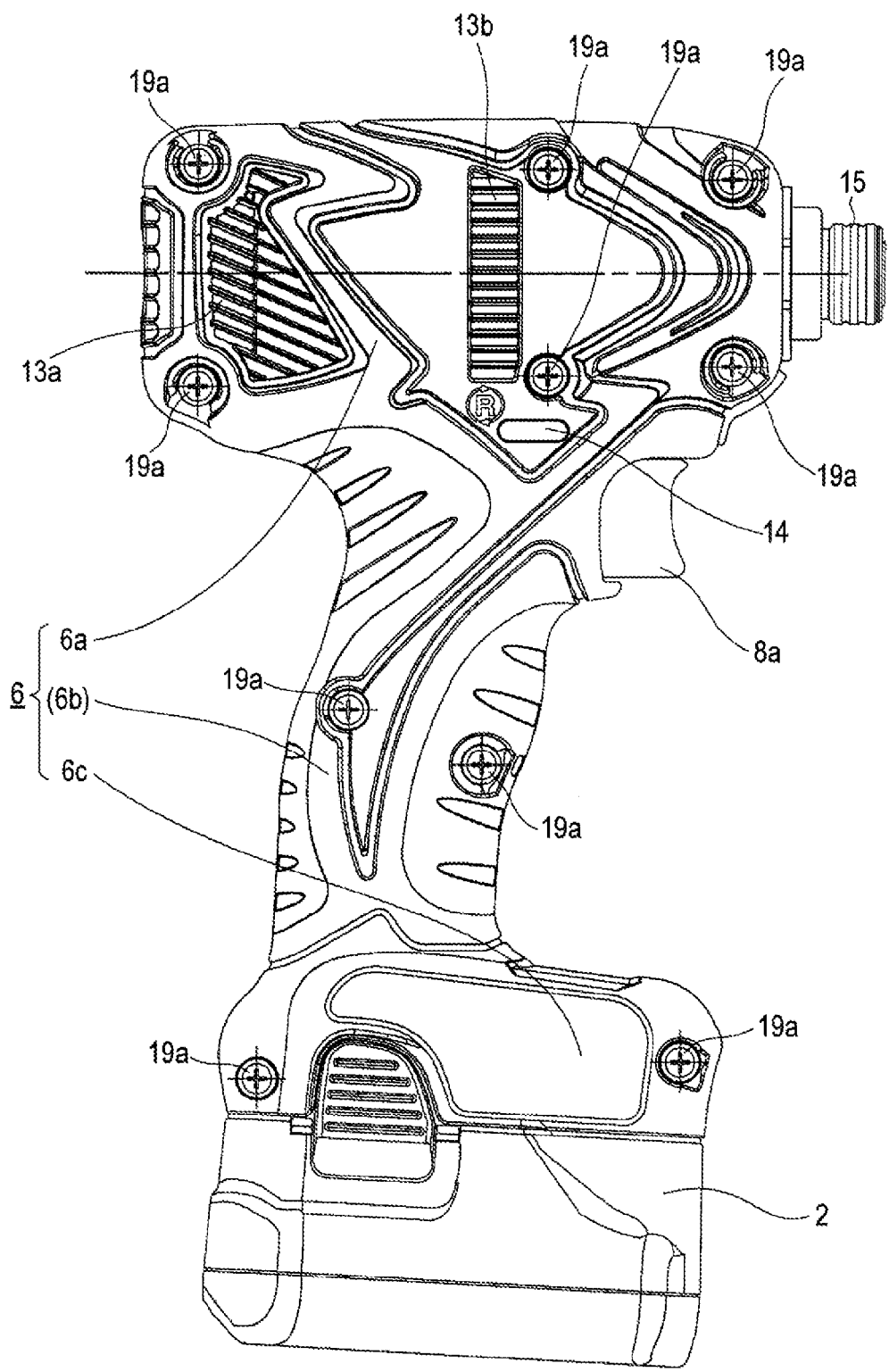
FIG. 2 is a lateral view illustrating the electric tool 1 according to the embodiment of the present invention.

FIG. 2 is a lateral view illustrating the electric tool 1 according to the embodiment of the present invention. The housing 6 is composed of three portions (the body portion 6a, the handle portion 6b, and the battery holding portion 6c), and air outlets 13b for discharging cooling air are formed in the vicinity of the outer circumference of the body portion 6a in the radial direction of the cooling fan 18. The housing 6 is formed such that the left and right components are separable at a perpendicular plane passing the rotation shaft 4 of the motor 3, and the separable left and right components of the housing 6 are fixed by a plurality of screws 19a. At the front side of the housing 6, the sleeve 15 constituting a front end tool holding unit protrudes. At a portion of the battery holding portion 6c of the housing 6, a mode selecting switch for switching between drive modes (a drill mode and an impact mode) of the motor 3, and a mode display LED (both of which will be described below) are provided.

Figure 3:
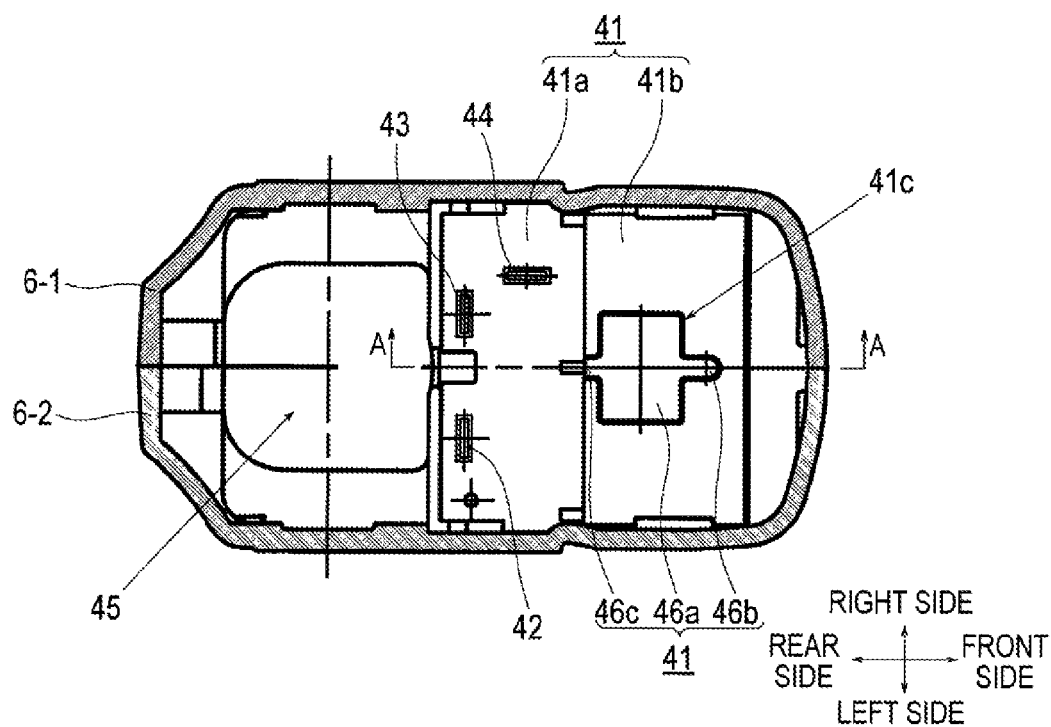
FIG. 3 is a bottom view illustrating the electric tool 1 with a battery pack 2 removed.

FIG. 3 is a bottom view illustrating the electric tool 1 with the battery pack 2 removed. The housing 6 is composed of a right housing 6-1 and a left housing 6-2. In the vicinity of the inside of the handle portion 6b of the housing 6, a battery accommodating room 45 for accommodating the extending portion 2a of the battery pack 2 is formed. In the vicinity of the front of the battery accommodating room 45, three terminals for coming into contact with contact nodes of the battery pack 2, i.e. a positive terminal 42, an LD terminal 43, and a negative terminal 44 are provided. These three terminals are held on a plate-shaped portion of the base 41. The base 41 includes two plate-shaped portions, i.e. a power-supply-terminal holding portion 41a for holding the three terminals, and a communication-terminal holding portion 41b for fixing the communication terminal which is a feature of the present invention, and is integrally formed of a polymer resin such as plastic. The left, right, and front of the base 41 are sandwiched between the right housing 6-1 and the left housing 6-2 such that the base 41 is fixed. However, the fixing method is not limited thereto. The base 41 may be fixed to the housing 6 by a known fixing method such as screwing.

At the communication-terminal holding portion 41b, the communication terminal (to be described below) is provided. At an opening portion 41c of the base 41 for exposing the communication terminal, the socket cover 46 is attached. The socket cover 46 is a cover for covering the opening portion 41c such that a socket (to be described below) is not exposed to the outside of the housing 6 when not in use. The socket cover 46 includes a flat plate portion 46a having a substantially rectangular shape, a supporting portion 46b for holding the flat plate portion 46a such that the flat plate portion 46a is rotatable with respect to the communication-terminal holding portion 41b, and a handle portion 46c formed at a position spaced from the supporting portion 46b at the front of the flat plate portion 46a. As the structure of the socket cover 46 and the method of attaching the socket cover 46, known various structures and methods can be used. In the present embodiment, the flat plate portion 46a is held so as not to break away from the communication-terminal holding portion 41b due to elastic deformation of an attaching portion of rubber, and the flat plate portion 46a is held to be substantially rotatable. The material of the socket cover 46 can be arbitrarily selected from members capable of obtaining dustproof and waterproof effects. For example, it is preferable to form the socket cover 46 with an elastic member of rubber, plastic, or the like. The handle portion 46c serves as a locking mechanism for fixing the flat plate portion 46a fit into the opening portion 41c such that the flat plate portion 46a does not get out of the opening portion 41c, and also serves as a knob for opening the flat plate portion 46a. In the present embodiment, at a portion of the base 41 where the handle portion 46c of the communication-terminal holding portion 41b is positioned, a groove is formed. The handle portion 6b is pushed into the groove such that the groove serves as a locking mechanism for stably holding the socket cover 46.

Figure 4:
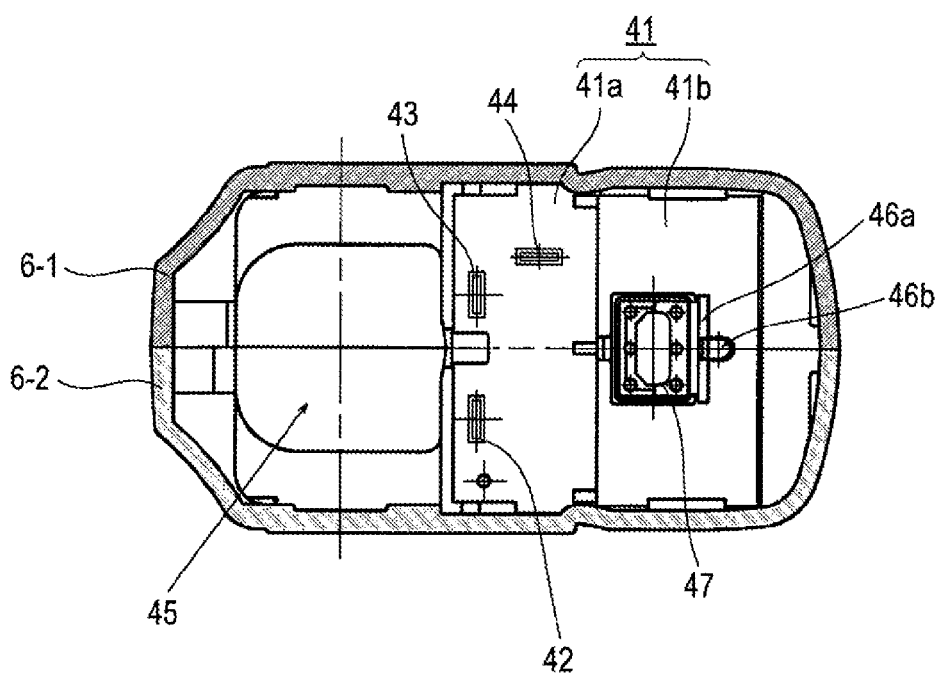
FIG. 4 is a bottom view illustrating the electric tool 1 with the battery pack 2 removed, and shows when a socket cover 46 is removed such that a communication terminal is opened.

FIG. 4 is a bottom view illustrating the electric tool 1 with the battery pack 2 opened, and shows when a socket cover 46 is opened such that the communication terminal 47 is opened. The socket cover 46 is opened at about 90 or more degrees around the supporting portion 46b, and is disposed such that the flat plate portion 46a of the socket cover 46 extends in the vertical direction. In this state, the female communication terminal 47 is exposed. For example, the communication terminal 47 may be a socket of a universal serial bus (USB) mini type or a USB micro type based on the USB standard. In the present embodiment, the communication terminal uses the USB standard in widespread use, and the shape of a socket 47b uses a Mini-B-Socket/Receptacle or Micro-B-Socket/Receptacle of the USB standard. It is possible to use a USB cable easily acquired by using the USB standard to enable easy connection with an external device such as a personal computer. Further, the USB standard or improved USB standard can be used for power supply from the outside through a USB cable. Therefore, there is a merit in which, even when the battery pack 2 is removed, it is possible to supply power to electronic devices on the control circuit board 9.

Figure 5:
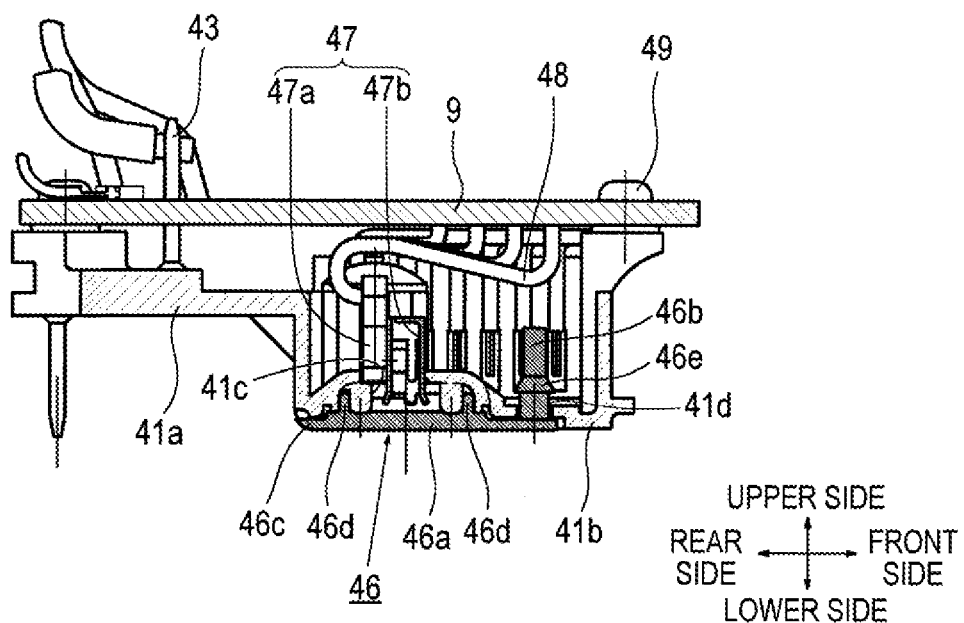
FIG. 5 is a cross-sectional view illustrating a detailed shape of a portion including a control circuit board 9 and a base 41.

FIG. 5 is a cross-sectional view illustrating the detailed shape of a portion including the control circuit board 9 and the base 41 as taken along the line A-A of FIG. 3. A socket base plate 47a on which the communication terminal 47 is mounted is configured by a component separate from the base 41 (41a and 41b) and the control circuit board 9. On the control circuit board 9, a micro computer 61 (to be described below) for performing drive control on the motor 3 is mounted. On the lower side of the control circuit board 9, the base 41 is attached by a screw 49. The base 41 includes two portions, i.e. the power-supply-terminal holding portion 41a formed stepwise such that the vertical position changes, and the communication-terminal holding portion 41b. The communication terminal 47 is provided inside the communication-terminal holding portion 41b. The communication terminal 47 is composed of the socket base plate 47a and the socket 47b fixed to the socket base plate 47a. The communication terminal 47 is exposed to the outside by removing the battery pack 2, such that it is possible to mount a communication plug (to be described below).

The socket 47b is disposed to allow a connector of the mini-B-plug side of the USB cable or a communication terminal of the communication plug (to be described below) to be inserted from bottom upward. The socket 47b is mounted on the socket base plate 47a, and the socket base plate 47a is connected to the control circuit board 9 by a plurality of lead wires 48. The control circuit board 9 is electrically connected to a power supply terminal connected to the battery pack 2 and the trigger switch 8 (see FIG. 1). Also, the control circuit board 9 is connected to the inverter board 10 (see FIG. 1) through a motor flat cable. An opening portion of the socket 47b is disposed at the opening portion 41c of the base 41, and the opening portion 41c of the base 41 is closed by the socket cover 46 when the socket 47b is not in use. The socket cover 46 includes a rectangular flat plate portion 46a, and the supporting portion 46b which is a cylindrical portion extending from the flat plate portion 46a forward and extending from the vicinity of its front end upward. The supporting portion 46b is inserted into a through-hole 41d which has a circular section shape and is provided in front of the opening portion 41c of the communication-terminal holding portion 41b, and in the vicinity of the center of the cylindrical portion, an umbrella-shaped portion 46e is provided such that the supporting portion 46b does not get out of the through-hole 41d.

In the socket cover 46, at the rear of the rectangular flat plate portion 46a, the handle portion 46c is positioned to allow the user to hold it when rotating the socket cover 46 around the supporting portion 46b. On the upper side of the flat plate portion 46a, that is, on the side facing the socket 47b, a rib 46d is formed to create a tight seal together with the inner wall of the opening portion 41c such that entrance of dust, water, and the like is prevented. The rib 46d is continuously formed to surround the socket 47b. In this way, the opening portion 41c is tightly sealed by the socket cover 46 when not in contact with any connector. Therefore, it is possible to prevent foreign materials from coming between the terminals of the socket 47b while electrically insulating the terminals from each other, and it is possible to prevent short-circuiting of the terminals. Further, since the socket cover 46 is used, it is possible to obtain high waterproofing effectiveness in addiction to the dustproofing effect.

Figure 6:
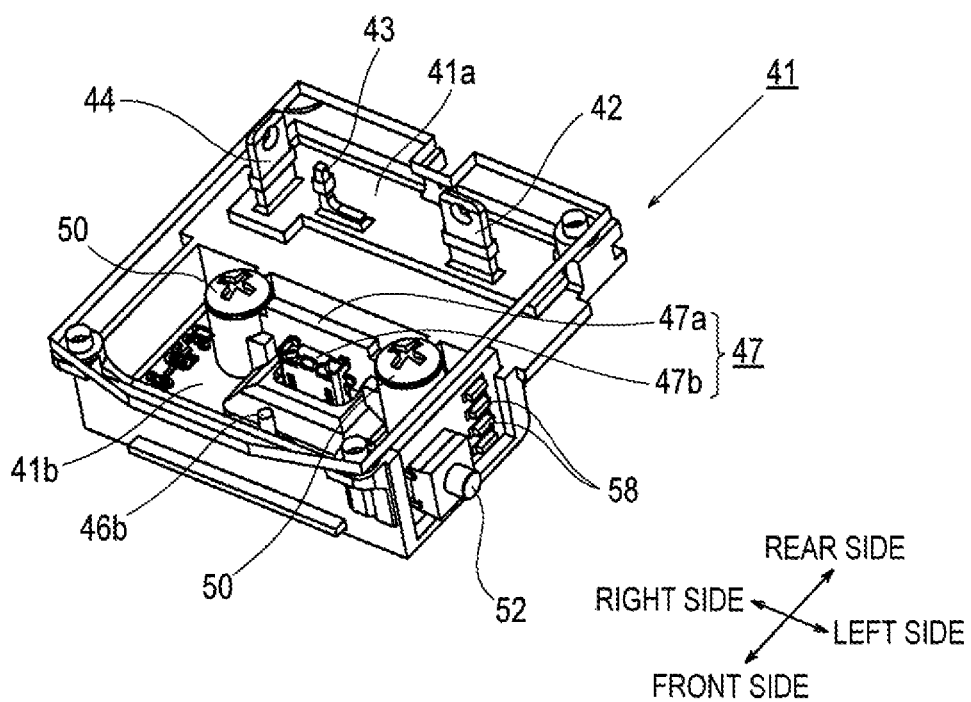
FIG. 6 is a perspective view illustrating the shape of the base 41 as seen from the upper side.

FIG. 6 is a perspective view illustrating the shape of the base 41 as seen from the upper side (the control circuit board (9) side). The base 41 is integrally formed of a synthetic resin such as plastic, and the three power supply terminals (the positive terminal 42, the LD terminal 43, and the negative terminal 44) are formed by casting. Further, in front of the power supply terminals, the communication terminal 47 is fixed. The communication terminal 47 is composed mainly of the socket 47b and the socket base plate 47a for holding the socket 47b, and the socket base plate 47a is guided to a groove portion and is fixed to the communication-terminal holding portion 41b by two screws 50. On the left lateral side of the base 41, a mode selecting switch 51 is provided and four mode display LEDs 58 are provided in front of the mode selecting switch 51. The mode selecting switch 51 can be pushed to switch among the control modes of the motor 3, for example, the drill mode, a clutch mode, and the impact mode. Further, in each control mode, it may be possible to change the degree of strength or the like.

Figure 7:
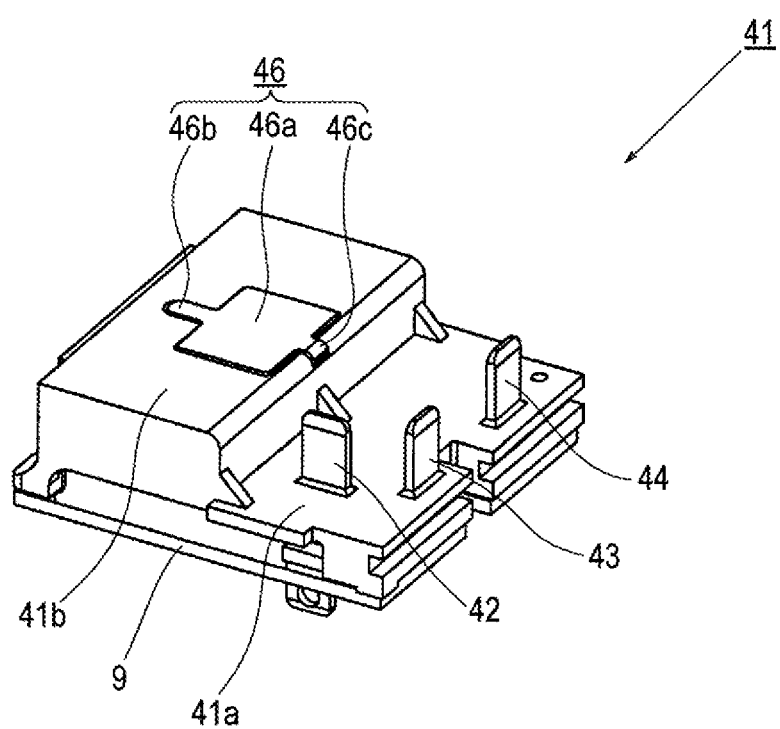
FIG. 7 is a perspective view illustrating the shape of the assembly of the control circuit board 9 and the base 41 as seen from the lower side (the battery pack (2) side)

FIG. 7 is a perspective view illustrating the shape of the assembly of the control circuit board 9 and the base 41 as seen from the lower side (the battery pack (2) side). The three terminals, i.e. the positive terminal 42, the LD terminal 43, and the negative terminal 44 are provided to the power-supply-terminal holding portion 41a of the base 41, and are sandwiched by socket portions of the battery pack 2 when the battery pack 2 is mounted. The positional relation between the power-supply-terminal holding portion 41a and the communication-terminal holding portion 41b, and the step portion formed by them correspond to the shape of the upper surface of the battery pack 2. Therefore, if the battery pack 2 is mounted into the electric tool 1, the power-supply-terminal holding portion 41a and the communication-terminal holding portion 41b come into close contact with the battery pack 2 or face the battery pack 2 with a predetermined gap. As a result, when the battery pack 2 is mounted, the socket cover 46 is covered by the battery pack 2. This means that, in order to connect a USB cable or a communication plug (not shown) to the communication terminal 47, the battery pack 2 should be removed. Therefore, it is possible to reliably prevent a malfunction of erroneously driving the electric tool when a USB cable or the like is connected to the communication terminal 47 for performing program changing or the like. Further, when the electric tool 1 is used, since the battery pack 2 is always mounted, the communication terminal 47 is tightly sealed by the socket cover 46 such that it is possible to prevent dust and water from coming into the communication terminal (47) portion. Furthermore, in a case where the mounting of the socket cover 46 onto the opening portion 41c is insufficient, it is not possible to bring the battery pack 2 and the base 41 into sufficiently close contact with each other. In this case, in order to prevent locking, a release mechanism may be configured. Then, it is possible to prevent omission or failure of mounting the socket cover 46.

Figure 8:
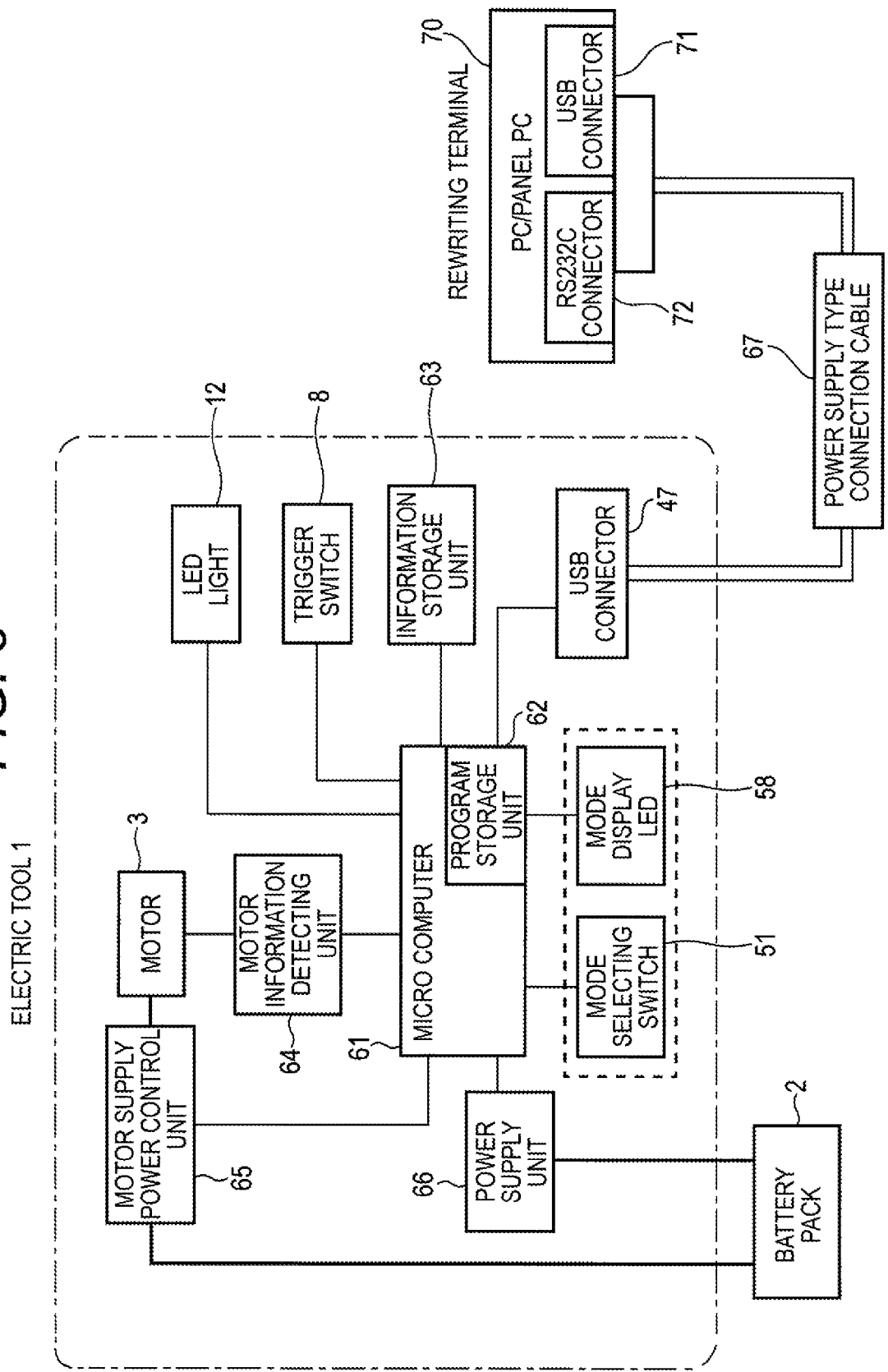
FIG. 8 is a block diagram illustrating a control circuit of the electric tool 1 according to the embodiment of the present invention.

Next, the control circuit of the electric tool 1 will be described with reference to the block diagram of FIG. 8. If the battery pack 2 is mounted into the electric tool 1, a predetermined DC voltage is supplied from the battery pack 2 to a power supply unit 66 and a motor supply power control unit 65. The motor supply power control unit 65 is composed of an inverter circuit composed of the six switch elements 11 such as FETs connected in a three-phase bridge form, and is mounted on the inverter board 10 (see FIG. 1). According to the control of the micro computer 61, the gate voltages of the switch elements 11 are controlled such that a current is supplied to a predetermined phase of star-connected stator windings U, V, and W of the motor 3, whereby the motor 3 rotates.

The motor 3 is composed of a three-phase brushless DC motor. This brushless DC motor is of a so-called inner rotor type, and is configured to include the rotor including the permanent magnet having a plurality of sets of N poles and S poles, and the stator composed of the star-connected three-phase stator windings U, V, and W. At the motor 3, in order to detect the rotation position of the rotator, three Hall elements are disposed in a circumferential direction at predetermined intervals, for example, every 60 degrees, and a motor information detecting unit 64 is provided to detect a current value flowing in the motor 3, and the like.

The micro computer 61 has a program storage unit 62 composed of a non-volatile memory for storing programs, and can use commercial 16-bit or 32-bit microprocessors. The micro computer 61 drives the motor supply power control unit 65 on the basis of a position detection signal from the motor information detecting unit 64, so as to change a pulse width (duty ratio) of a PWM signal on the basis of a detection signal of a manipulation amount (stroke) of the trigger switch 8. In this way, a power supply amount from the motor supply power control unit 65 to the motor 3 is adjusted, whereby the activation, stop, and rotation speed of the motor 3 is controlled.

The micro computer 61 operates by a DC voltage of 5V, for instance. For this reason, in order to drive the micro computer 61, the power supply unit 66 decreases the DC voltage of the battery pack 2. The micro computer 61 is connected to the mode selecting switch 51 and the mode display LEDs 58, and if a worker manipulates the mode selecting switch 51, the selected operation mode is displayed by the mode display LEDs 58. In the present embodiment, the four mode display LEDs 58 are provided, and the operation modes are displayed by display patterns of the individual LEDs.

Also, the micro computer 61 is connected to an ON/OFF control signal line of the LED light 12, and an output line of the trigger switch 8. Further, the micro computer 61 is connected to an information storage unit 63 having memory space for execution of a computer program in a micro computer 61. Preferably, the information storage unit 63 is a known non-volatile memory such as a flash memory; however, it may be other known volatile or non-volatile memories.

In the program storage unit 62 of the micro computer 61, a plurality of computer programs is stored in advance, and a control parameter for designating a computer program to be used from the plurality of computer programs is stored. The memory contents of the program storage unit 62 can be read or written from the external rewriting terminal 70 through a power supply type connection cable 67. Therefore, the control parameter can be rewritten to designate another computer program to be executed in the micro computer 61. To this end, when the electric tool 1 and the rewriting terminal 70 are connected by the power supply type connection cable 67, the program storage unit 62 needs to be accessible as if it was one of external storage devices. Here, the power supply type connection cable 67 is configured by including a power supply line (for example, 5V) to be a power supply for the micro computer 61 and associated devices in a communication cable having a plurality of lead lines. In the present embodiment, since at least a portion of cables based on the USB standard is used as the power supply type connection cable 67, the communication terminal (USB connector) 47 is provided to the electric tool (1) side, and a USB connector 71 is provided to the rewriting terminal 70.

From the communication terminal 47 to the micro computer 61, not only a signal line for communication but also a signal line for supplying the DC voltage of 5V to the micro computer 61 are provided. The rewriting terminal 70 may further include an RS232C connector 72, so as to be capable of performing communication using the RS232C standard, not the USB standard. If the RS232C standard is used, it is possible to add a protecting function of preventing communication from being performed when the electric tool 1 is connected to a USB cable of a personal computer by a general-purpose USB cable. Here, the rewriting terminal 70 can be a commercial personal computer; however, it is not limited thereto but may be other dedicated connection devices. Also, the contents rewritable from the rewriting terminal 70 may be a parameter stored in the program storage unit 62, and a stored computer program may also be rewritable. Further, if can access only the program storage unit 62, the rewriting terminal 70 can implement the objects of the present embodiment. However, the rewriting terminal 70 may be configured to be capable of direct communication with the micro computer 61, whereby more highly developed control can be implemented.

Figure 9:
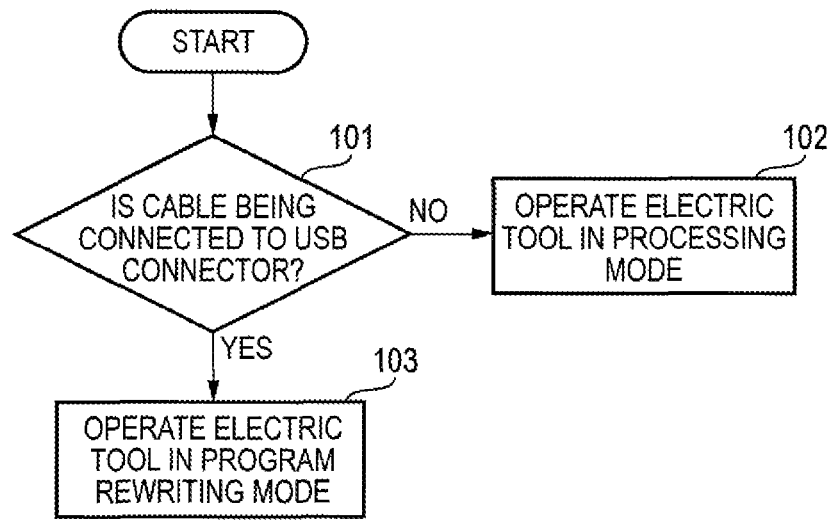
FIG. 9 is a flow chart illustrating a process procedure of a micro computer 61 when a rewriting terminal 70 is connected to a communication terminal 47 through a power supply type connection cable 67.

Next, a process procedure of the micro computer 61 when the rewriting terminal 70 is connected to the communication terminal 47 through the power supply type connection cable 67 will be described with reference to the flow chart of FIG. 9. If the battery pack 2 is installed or a direct current is supplied from the power supply type connection cable 67 through the communication terminal 47, the micro computer 61 of the electric tool 1 starts. If starting, in STEP 101, the micro computer 61 first detects whether the power supply type connection cable 67 is being connected to the communication terminal 47. In a case where the power supply type connection cable 67 is not being connected to the communication terminal 47, on the basis of the above-mentioned disposition feature of the communication terminal 47, the micro computer 61 can determine that the battery pack 2 has been installed. Therefore, the micro computer 61 determines that a processing mode has been set to drive the front end tool, and executes a designated program stored in the program storage unit 62 in STEP 102.

In a case where it is determined in STEP 101 that the power supply type connection cable 67 is being connected to the communication terminal 47, the micro computer 61 can determine that the battery pack 2 has been removed. Therefore, the micro computer 61 determines that the processing mode has been set to drive the front end tool, and makes the electric tool operate in a program rewriting mode to allow reading and rewriting of the contents stored in the program storage unit 62 in STEP 103. In the program rewriting mode, the contents of the program storage unit 62 of the micro computer 61 can be rewritten from the external rewriting terminal 70. Then, if the power supply type connection cable 67 is removed from the communication terminal 47, the micro computer 61 terminates the program rewriting mode, and if the battery pack 2 is installed, the micro computer 61 can make the electric tool perform the following operation according to the rewritten program and parameters.

As described above, according to the embodiment of the present invention, if the external device is connected to the electric tool through the connector, it is possible to rewrite the computer programs and/or control parameters for controlling the modes. Therefore, it is possible to change the characteristic of the electric tool according to the usage of a user. Further, in a case of using the electric tool, since the housing 6 is tightly fit into the housing 6, it is difficult for moisture and dust to come into the connector portion. Therefore, it is possible to achieve better waterproofing and dustproofing as compared to a case where the connector portion is exposed from the housing directly to the outside.

Second Embodiment

Figure 10:
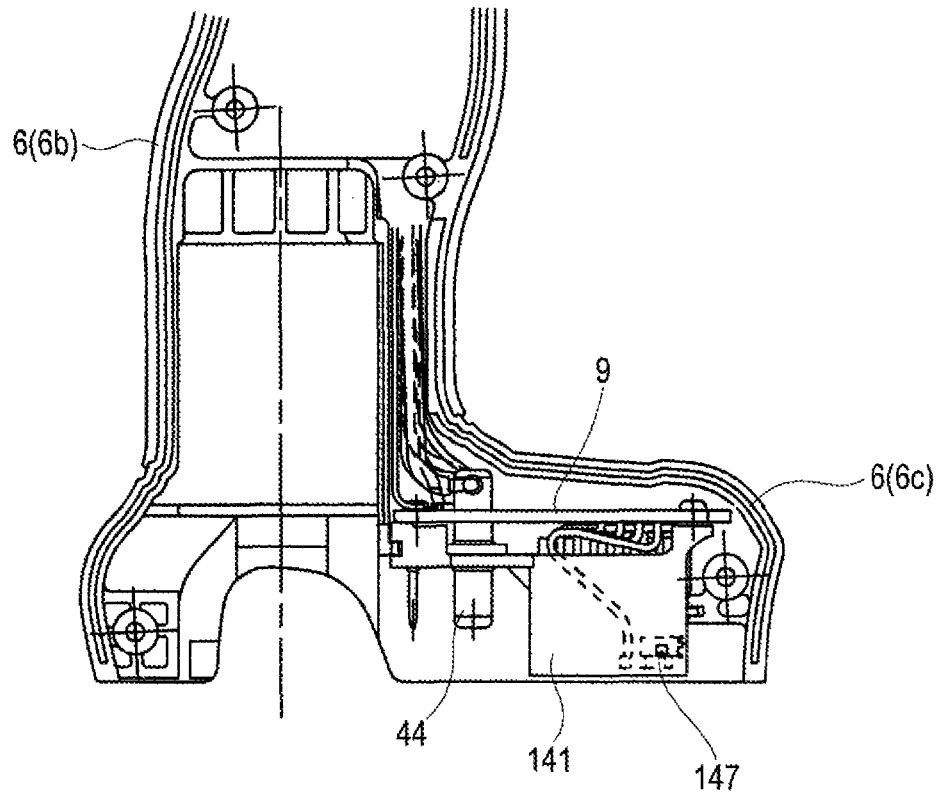
FIG. 10 is a local sectional view illustrating the disposition position of a communication terminal of an electric tool according to a second embodiment of the present invention.
Figure 11:
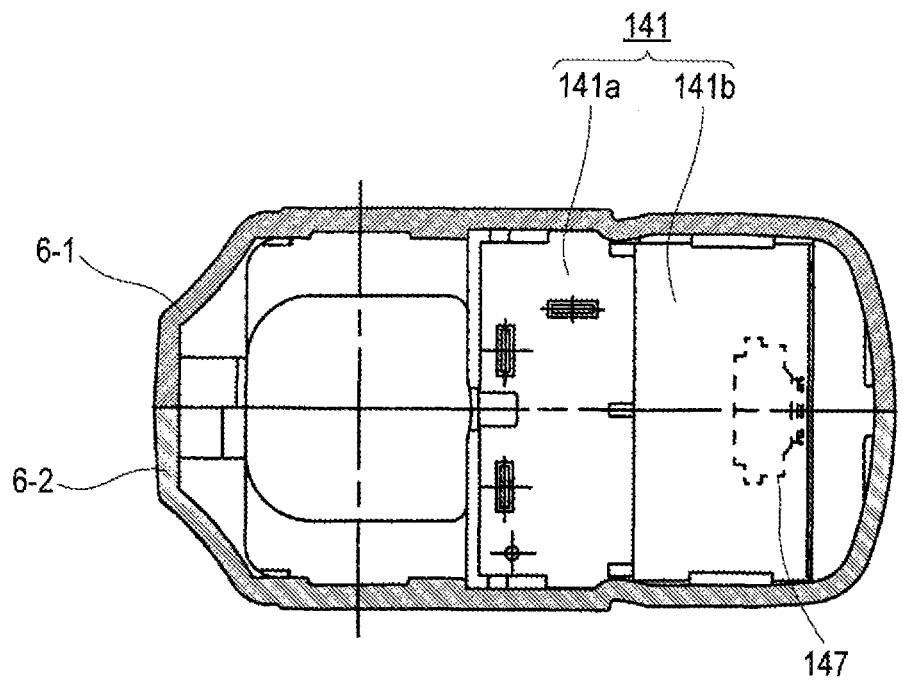
FIG. 11 is a bottom view illustrating the disposition position of the communication terminal of the electric tool according to the second embodiment of the present invention, with a battery pack 2 removed.

Next, a second embodiment of the present invention will be described with reference to FIGS. 10 and 11. FIG. 10 is a local sectional view illustrating a disposition position of a communication terminal of an electric tool according to a second embodiment of the present invention. The second embodiment is different from the first embodiment in disposition of a connector. For this reason, a base 141 is configured differently from the base 41 of the first embodiment, and a communication terminal (USB connector) 147 is positioned at the front end portion of the base 141. FIG. 11 is a bottom view illustrating the electric tool with a battery pack 2 removed, and shows the portion where the communication terminal 147 is positioned by a dotted line.

Further, although any socket cover is not shown in FIG. 11, a cover identical to the socket cover 46 of FIG. 1 is provided.

Third Embodiment

Figure 12:
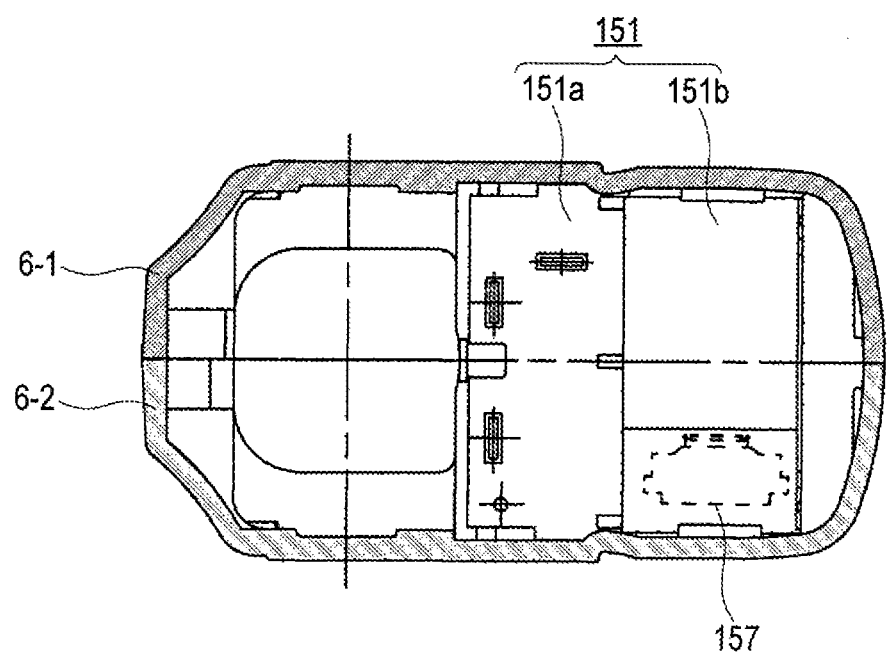
FIG. 12 is a local sectional view illustrating the disposition position of a communication terminal of an electric tool according to a third embodiment of the present invention.

FIG. 12 is a view illustrating a third embodiment of the present invention. The third embodiment is different from the first and second embodiments in disposition of a connector. In other words, a base 151 is configured differently from the base 41 of the first embodiment, and a communication terminal (USB connector) 157 is positioned at a side of the base 151 (the left side in FIG. 12). FIG. 12 is a bottom view illustrating the electric tool with a battery pack 2 removed, and shows the portion where the communication terminal 147 is positioned by a dotted line. Further, although the communication terminal 157 is provided on the left lateral side of the housing, it may be provided on the right lateral side.

Fourth Embodiment

Figure 13:
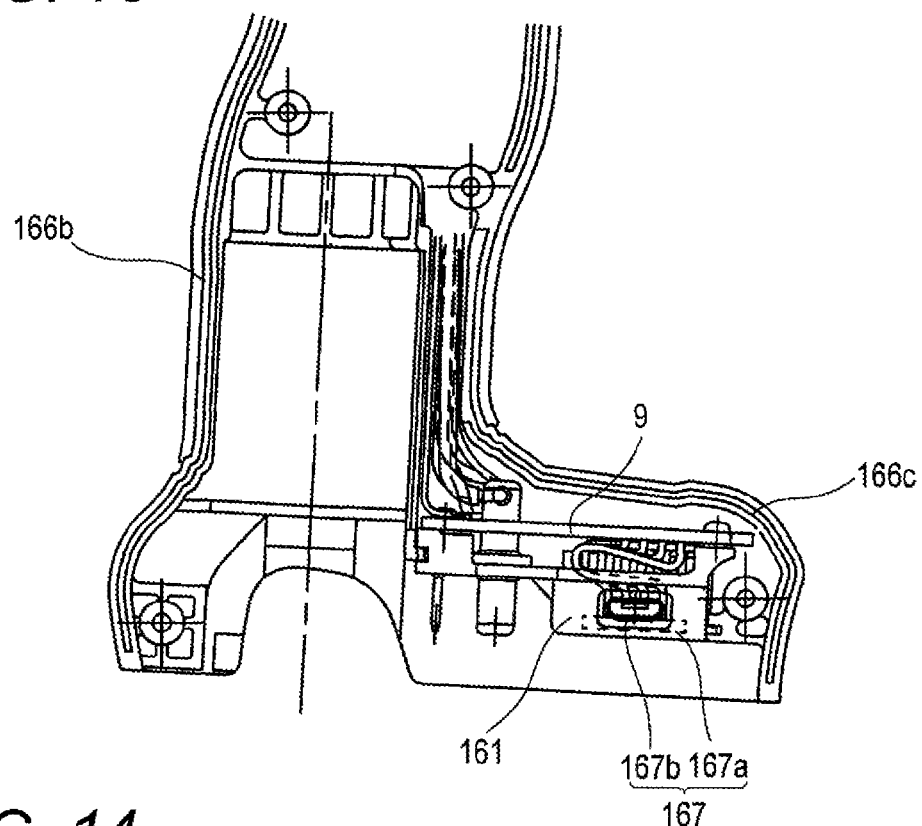
FIG. 13 is a bottom view illustrating the disposition position of a communication terminal of an electric tool according to a fourth embodiment of the present invention, with a battery pack 2 removed.
Figure 14:
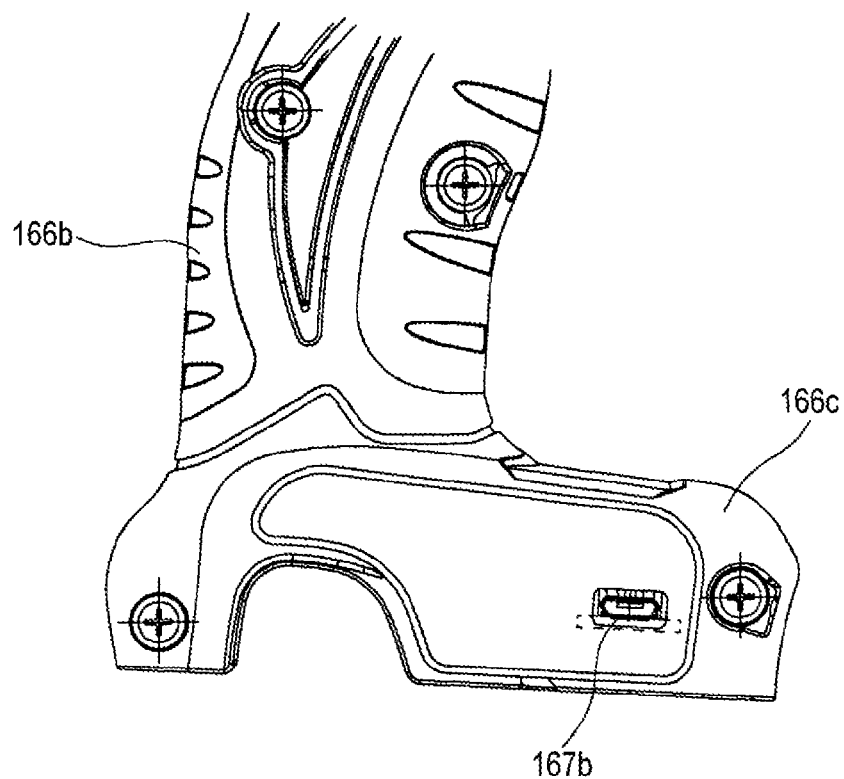
FIG. 14 is a local sectional view illustrating the disposition position of the communication terminal of the electric tool according to the fourth embodiment of the present invention.

FIGS. 13 and 14 are views illustrating a fourth embodiment of the present invention. The fourth embodiment is different from the first to third embodiments in the disposition position of a connector. In the fourth embodiment, a communication terminal (USB connector) 167 is attached to a lateral side of the battery holding portion 6c of the housing. Further, as shown in FIG. 14, the socket 167b is configured to allow a USB cable to be connected from the outside of the housing. The socket 167b is hold by a socket base plate 167a, and the socket base plate 167a is fixed to a base 161. In this point, the fourth embodiment is identical to the first to third embodiments.

If the communication terminal is configured to be accessible from the outside of the housing as described above, it is possible to easily insert a USB cable into the communication terminal, and thus the efficiency of a program changing process is improved. Further, although the socket 167b is exposed to the outside in FIG. 14, it may also be configured to be covered by a socket cover (not shown) when any USB cable is not being connected to the socket 167b. Meanwhile, if the communication terminal is provided at a position which is accessible from the outside of the housing, since it is unnecessary to remove the battery pack, the user may erroneously manipulate the trigger manipulation portion 8a during a program updating process. Control of a micro computer for preventing that erroneous manipulation is shown in the flow chart of FIG. 15.

Figure 15:
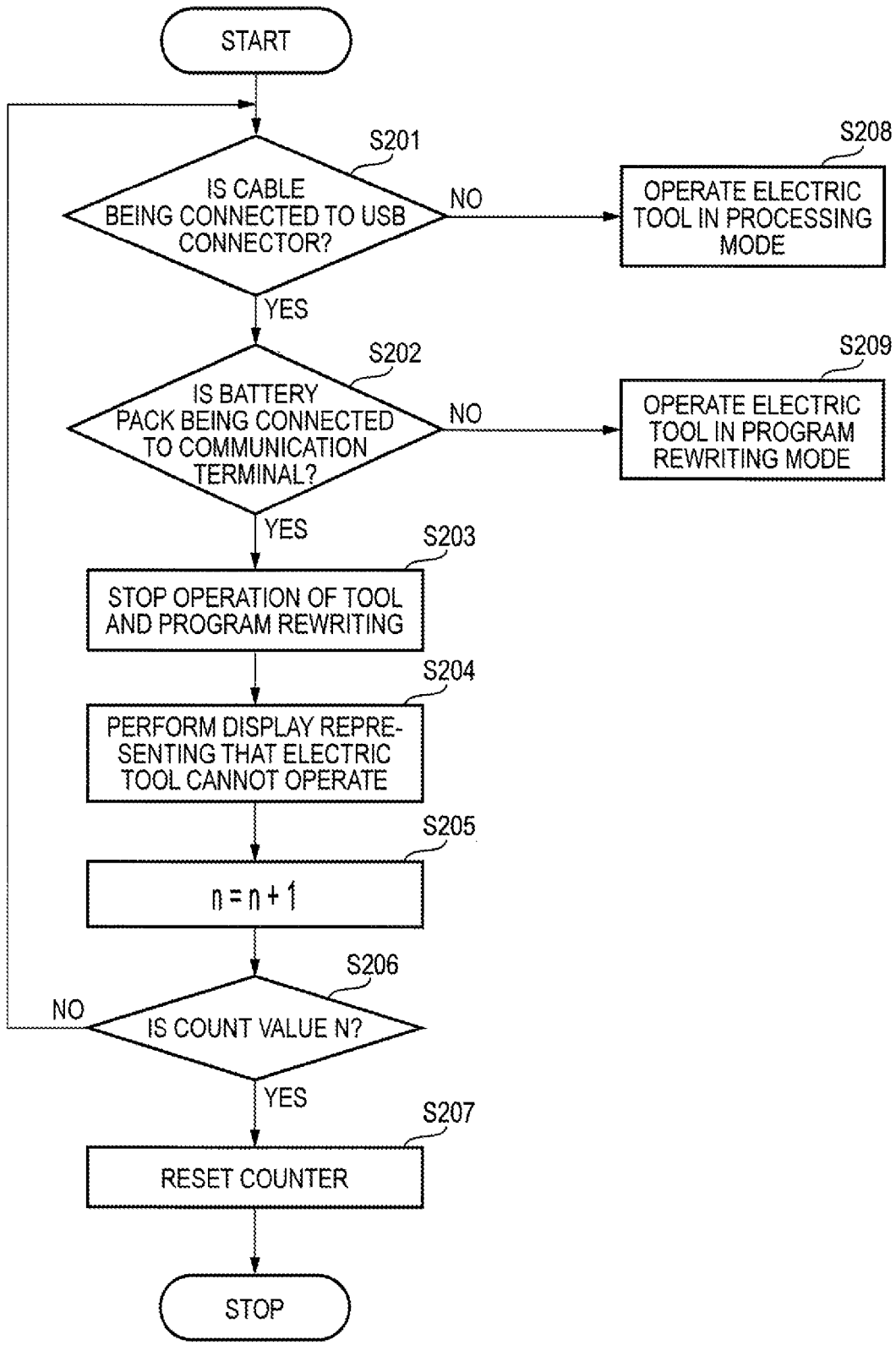
FIG. 15 is a flow chart illustrating a process procedure of a micro computer 61 according to the fourth embodiment of the present invention.

FIG. 15 is a flow chart illustrating a process procedure of the micro computer according to the fourth embodiment of the present invention. If power is supplied, the micro computer included in a control device starts the operation. First, in STEP 201, the micro computer determines whether any USB cable is being connected to the communication terminal (USB connector) 167. For example, this determination can be made according to whether power of 5V is supplied from the outside through a USB cable. Here, in a case where any USB cable is not being connected to the communication terminal 167, power is being supplied from the battery pack 2 and normal processing is required. Therefore, in STEP 208, the micro computer performs control such that the electric tool operates in a processing mode.

In a case where it is determined in STEP 201 that a USB cable is being connected to the communication terminal 167, in STEP 202, the micro computer determines whether the battery pack 2 is being connected to the communication terminal 167. Here, in a case where the battery pack 2 is not being connected to the communication terminal 167, since power of 5V is supplied only from the outside to the micro computer through a USB cable, the micro computer determines that it is required to perform a program rewriting process, and operates the electric tool in the program rewriting mode in STEP 209.

In a case where it is determined in STEP 202 that the battery pack 2 is being connected to the communication terminal 167, the micro computer stops (or does not start) the operation of the tool in the processing mode and control of a program rewriting operation, in STEP 203, and performs error display representing that the electric tool cannot operate, in STEP 204. This is because it is excluded to perform program rewriting by connecting a USB cable to the USB connector in a state in which the battery pack 2 is being connected to the communication terminal. According to this configuration, during a program rewriting operation, since the battery pack cannot be installed, the motor 3 cannot be erroneously rotated. Therefore, it is possible to improve safety. Further, during program rewriting, power is supplied from the external device through a USB cable. Therefore, the operation of the micro computer does not become unstable due to a decrease in the battery voltage during a rewriting process. In STEP 204, the display representing that the electric tool cannot operate may be performed by blinking all of the mode display LEDs 58, or may be performed by another pattern of light or alarm display using sound.

Next, in STEP 205, the micro computer counts up the number (n) of times error display has been performed. Then, in STEP 206, the micro computer determines whether the count value has reached N. If the count value has not reached N, the micro computer returns to STEP 201. Meanwhile, in a case where it is determined in STEP 206 that the count value has reached N, the micro computer resets a counter in STEP 207, and finishes the process.

As described above, in the present embodiment, access from the external rewriting terminal 70 using a USB cable is possible, and when the battery is being connected to the communication terminal, program rewriting is not allowed. Therefore, it is possible to dramatically reduce a risk that an error may occur in program rewriting. Further, during program rewriting, the motor 3 cannot be erroneously activated. Therefore, it is possible to provide a safe electric tool.

Further, in the fourth embodiment, during program rewriting, the battery pack 2 should be removed. Alternatively, when power of 5V is supplied from the outside through a USB cable, power supply from the battery pack 2 to the motor 3 may be cut off, that is, the motor supply power control unit 65 (see FIG. 8) may be stopped, such that it is unnecessary to remove the battery pack.

Fifth Embodiment

Figure 16:
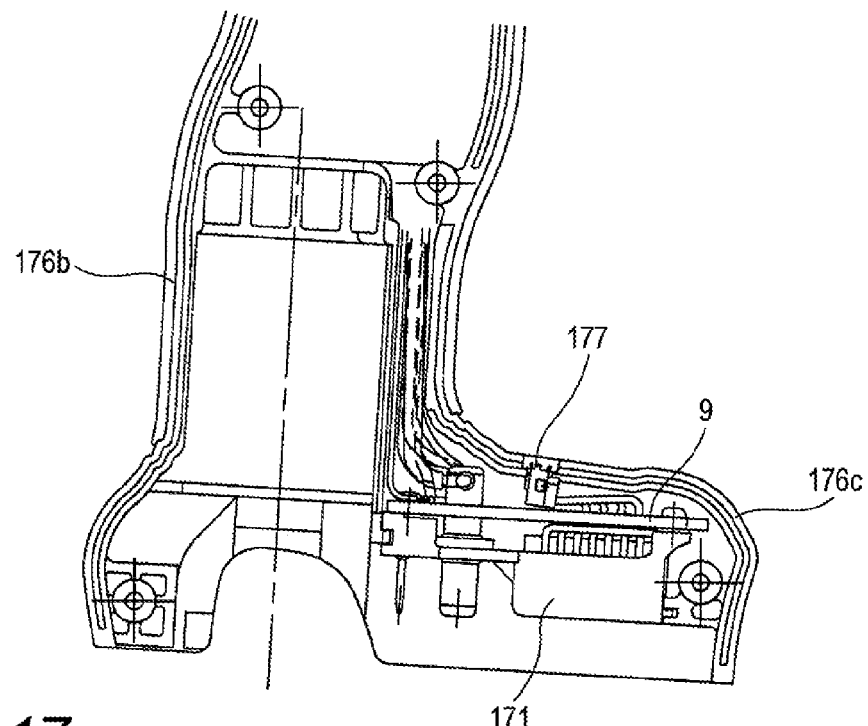
FIG. 16 is a local sectional view illustrating the disposition position of a communication terminal of an electric tool according to a fifth embodiment of the present invention.

Next, a fifth embodiment of the present invention will be described with reference to FIG. 16. The fifth embodiment has a configuration close to that of the fourth embodiment, and a communication terminal 177 is provided at a position allowing a USB cable to be inserted into the communication terminal 177 even if a battery pack 2 is not removed. In the present embodiment, the communication terminal 177 is provided over a control circuit board 9 in a battery holding portion 176c of a housing. A USB cable (not shown) is inserted from top down, that is, substantially in parallel with a handle portion 176b. Therefore, it is difficult for a user to hold the handle portion 176b with a cable inserted. As a result, it is possible to exclude a risk that the electric tool may operate during program rewriting. A process procedure of a micro computer according to the fifth embodiment may be performed as shown in the flow chart of FIG. 15.

Sixth Embodiment

Figure 17:
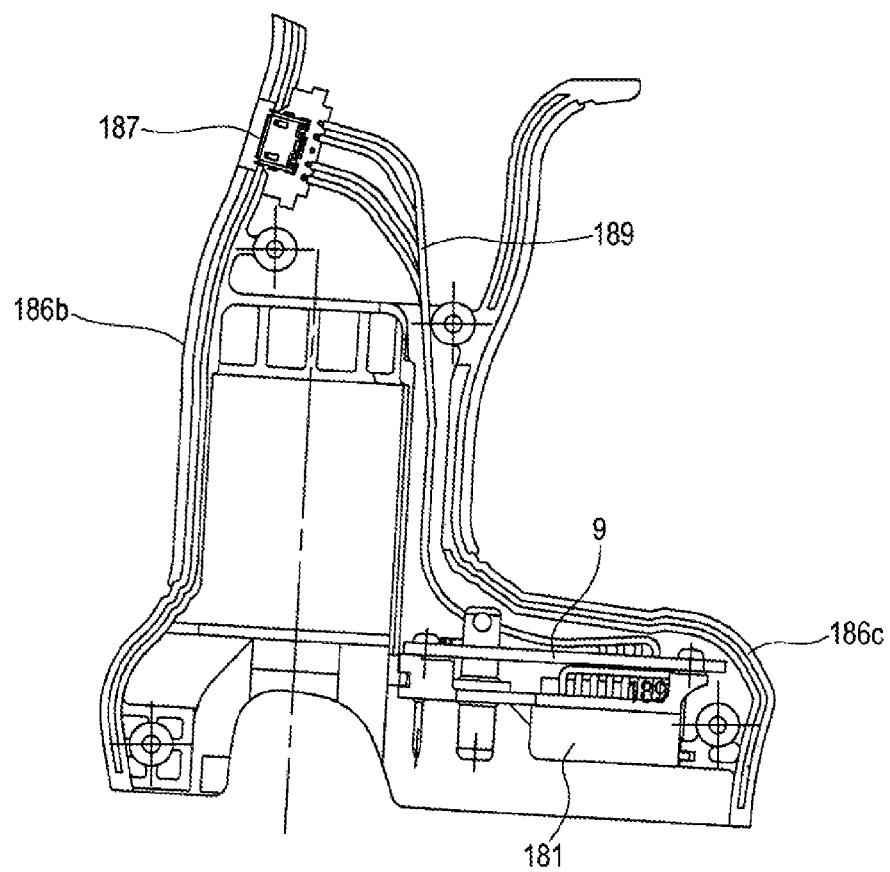
FIG. 17 is a local sectional view illustrating the disposition position of a communication terminal of an electric tool according to a sixth embodiment of the present invention.

Next, a sixth embodiment of the present invention will be described with reference to FIG. 17. The sixth embodiment has a configuration close to that of the fourth embodiment, and a communication terminal 187 is provided at a position allowing a USB cable to be inserted into the communication terminal 187 even if a battery pack 2 is not removed. The communication terminal 187 is connected to a control circuit board 9 through internal wires of the handle portion 186b and a communication line 189. In the present embodiment, the communication terminal 187 is provided at a portion of the handle portion 186b of a housing close to a body portion of the housing. A USB cable (not shown) is inserted from top down, that is, substantially in parallel with a handle portion 176b. Therefore, it is difficult for a user to hold the handle portion 176b with a cable inserted. As a result, it is possible to exclude a risk that the electric tool may operate during program rewriting. A process procedure of a micro computer according to the sixth embodiment may be performed as shown in the flow chart of FIG. 15.

Seventh Embodiment

Figure 18:
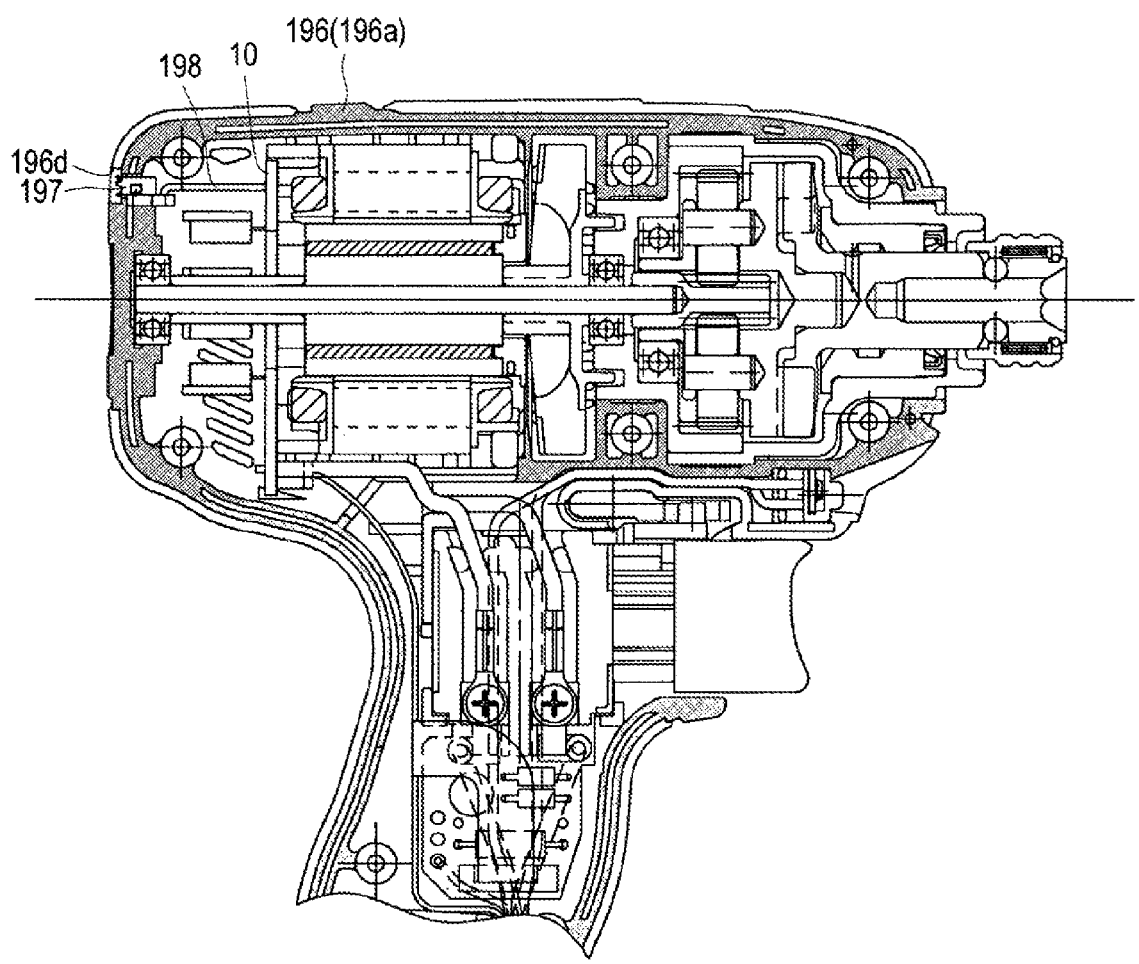
FIG. 18 is a local sectional view illustrating the disposition position of a communication terminal of an electric tool according to a seventh embodiment of the present invention.

Next, a seventh embodiment of the present invention will be described with reference to FIG. 17. The seventh embodiment has a configuration close to those of the fourth to sixth embodiments, and a communication terminal 197 is provided at a position allowing a USB cable to be inserted into the communication terminal 197 even if a battery pack 2 is not removed. The communication terminal 197 is connected to an inverter board 10 through a communication line 198. A USB cable (not shown) is inserted from the rear side of a body portion 196a of a housing 196 toward the front side from an open hole 196d of the housing 196. Further, although the open hole 196d has not a covering member such as a cap in FIG. 18, in order to prevent dust, water, and the like from coming into the housing 196, it is preferable to provide a socket cover or any cover. A process procedure of a micro computer according to the seventh embodiment may be performed as shown in the flow chart of FIG. 15.

Eighth Embodiment

Figure 19:
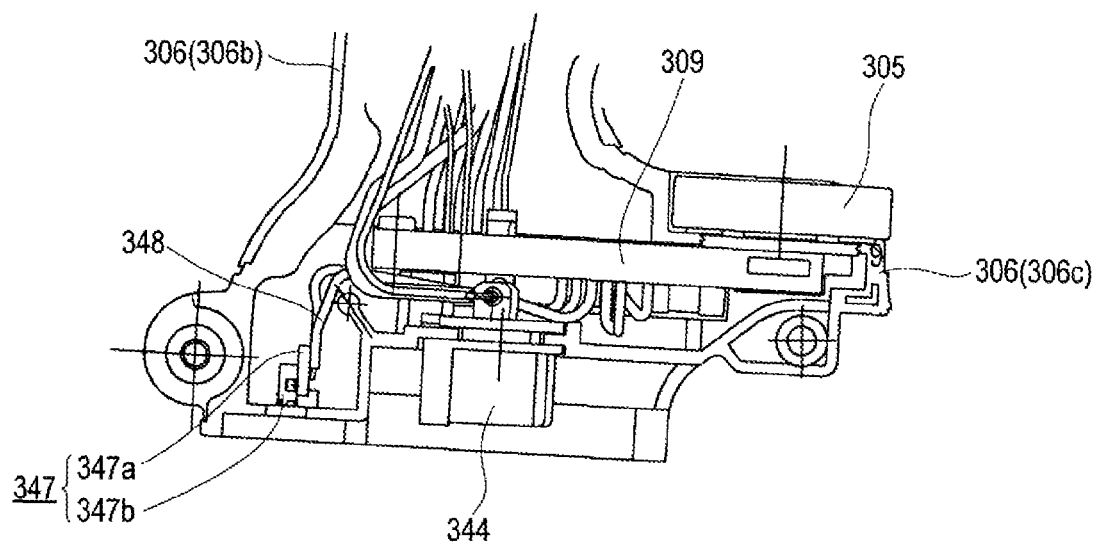
FIG. 19 is a local sectional view illustrating the disposition position of a communication terminal of an electric tool according to an eighth embodiment of the present invention.

Next, an eighth embodiment of the present invention will be described with reference to FIG. 19. The eighth embodiment has a configuration close to those of the first to third embodiments, and shows an example of application of the present invention to an electric tool including a battery pack having a shape different from those of the above-mentioned embodiments. This electric tool can be obtained by adding minor modification to the shape of a housing 306 of a commercial electronic pulse driver 'WM14DBL', providing an open hole 306d to a portion which is exposed when a battery pack is removed, that is, a lower surface side of a battery holding portion 306c, and mounting a communication terminal 347 at the exposure portion. The communication terminal 347 is composed of a socket base plate 347a and a socket 347b fixed to the socket base plate 347a. The socket 347b is disposed such that it is possible to insert a connector of the mini-B-plug side of a USB cable from bottom upward. Further, the socket 347b is connected to a control circuit board 309 by a plurality of lead wires 348.

In the eighth embodiment, if a battery pack (not shown) is not removed, any connection cable cannot be inserted into the communication terminal 347. Therefore, it is possible to provide a safe electric tool capable of preventing a motor 3 from being erroneously rotated during program rewriting. Further, although the open hole 306d has not a covering member such as a cap in FIG. 19, in order to prevent dust, water, and the like from coming into the housing 306, it is preferable to provide a socket cover or any cover.

Ninth Embodiment

Figure 20:
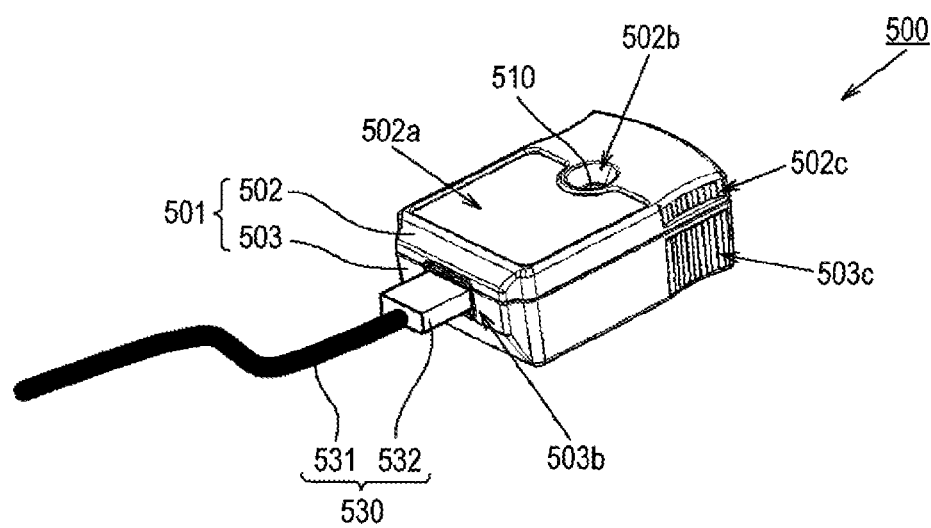
FIG. 20 is a perspective view illustrating the appearance of a communication plug 500 according to a ninth embodiment of the present invention.

Next, a communication plug 500 according to a ninth embodiment will be described with reference to FIGS. 20 to 25. FIG. 20 is a perspective view illustrating the appearance of the communication plug 500 according to the ninth embodiment of the present invention. In the ninth embodiment, as the power supply type connection cable 67 (see FIG. 8) for connecting the electric tool 1 and the communication terminal 47, the communication plug 500 having a small box shape, and a connection cable 530 for connecting the communication plug 500 to the rewriting terminal 70 (see FIG. 8) are configured, and as the connection cable 530, a general-purpose USB cable is used. Further, as the rewriting terminal 70, a commercial personal computer is used, and the connection cable 530 can be connected to a USB port of the personal computer, so as to establish a communication path between the electric tool 1 and the personal computer. In the personal computer, a program for accessing the program storage unit 62 (see FIG. 8) of the electric tool 1 and rewriting the contents of the program storage unit 62 is installed, and is executed. The communication plug 500 includes a converter for conversion between a protocol (for example, RS232 protocol) for performing communication with the electric tool 1 and a protocol (USP protocol) for performing communication with the rewriting terminal 70, and a housing 501 of the communication plug 500 has a box shape much smaller than the battery pack 2 of the electric tool 1. The housing 501 is configured to be separable into a base housing 503 and a housing cover 502, and they are fixed by a plurality of screws (not shown) such that the housing has a substantially cuboid outer shape. At one side of the housing 501 (the smallest side of the cuboid), a hole 503b for mounting a connector 532 of the connection cable 530 is formed. In the hole 503b, a socket (to be described below) corresponding to the connector 532 is disposed.

On the outside of the housing cover 502, a recessed label portion 502a is formed. The label portion 502a is a space for attaching a label having a model number and the like of the product printed thereon. A through-hole 502b is formed in close proximity to the label portion 502a, and a front end portion of an LED 510 is disposed to be exposed from the through-hole 502b. At some portions of the outer circumferential surface of the housing 501, holding portions 502c and 503c are formed such that their shapes are slightly arcuate, and the arcuate surfaces are jagged. A worker can hold the holding portions 502c and 503c formed on both sides of the LED 510, for example, with his thumb and forefinger, and easily mount or remove the communication plug 500 into or from the electric tool 1.

Figure 21:
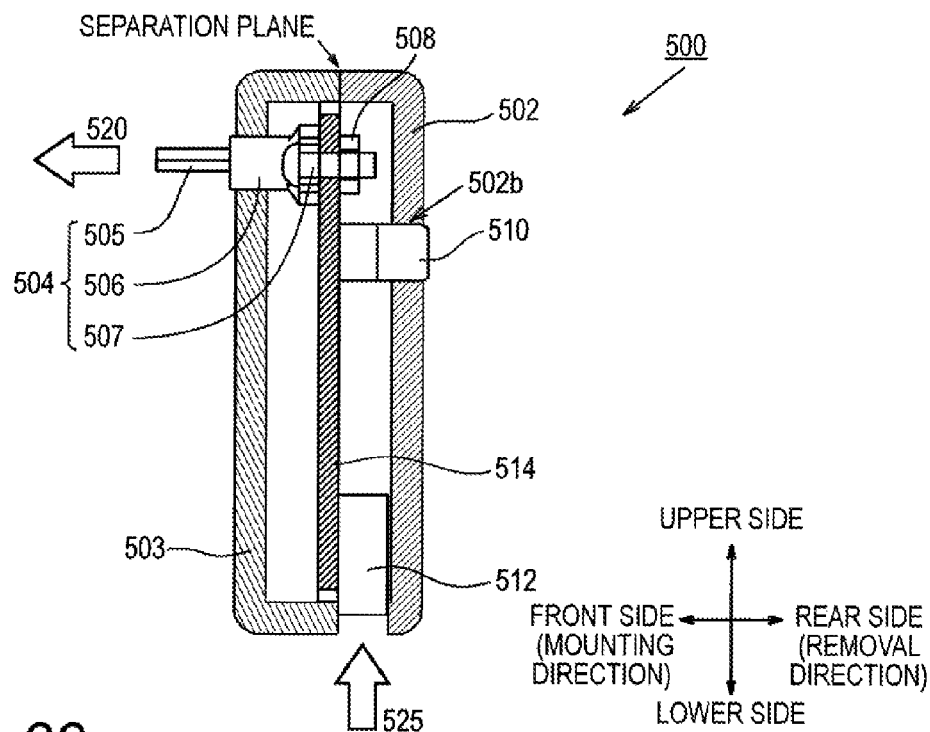
FIG. 21 is a longitudinal sectional view illustrating the entire structure of the communication plug 500 according to the ninth embodiment of the present invention.

FIG. 21 is a longitudinal sectional view illustrating the entire structure of the communication plug 500 according to the ninth embodiment of the present invention. The communication plug 500 is assembled by accommodating a base plate 514 in the base housing 503, and covering the base housing 503 with the housing cover 502. A plug 505 of the communication plug 500 is inserted into the communication terminal 47 (see FIG. 4) in the direction of an arrow 520. In the present embodiment, as directions of the communication plug 500, as shown in FIG. 21, the same direction as the arrow 520 is defined as the front side (mounting direction), and the opposite direction to the arrow 520 is defined as the rear side (removal direction), and other directions are defined as shown in FIG. 21. The housing 501 (502 and 503) of the communication plug 500 is made of a polymer resin such as plastic, and the plug 505 protrudes forward from the base housing 503. Specifically, the plug 505 protrudes from one of two largest surfaces of the cuboid housing 501. The base plate 514 serves as a base for attaching a communication terminal 504 to be inserted into the communication terminal of the electric tool, and a socket 512, and also serves as a circuit board for mounting electronic elements for communication protocol conversion. The separation plane of the housing 501 is a section perpendicular to the mounting direction. The base housing 503 and the housing cover 502 are fixed by a plurality of screws with the base plate 514 interposed therebetween, such that the base plate 514 is accommodated in the housing 501.

In the vicinity of an upper portion of the base plate 514, the communication terminal 504 is fixed. The communication terminal 504 includes a base portion 506, the plug 505 that protrudes forward from the base portion 506, a plurality of electrodes (not shown) that is provided on the rear side of the base portion 506, and a screw portion 507 for fixing the base portion 506 to the base plate 514. The screw portion 507 passes through a through-hole formed in the base plate 514, and is fixed by a nut 508. At the lower end portion of the base plate 514, the socket 512 is provided at a position spaced from the communication terminal 504. The socket 512 is, for example, a USB mini-B-socket. Here, the insertion direction of a connector of a USB cable (not shown) is arranged as shown by an arrow 525, to be perpendicular to the insertion direction (arrow 520) of the plug 505. Therefore, it is possible to reduce the thickness of the housing 501 in a front-rear direction, and to implement the communication plug 500 compactly. Further, even if an external force for pulling out the USB cable (a force in the opposite direction to the arrow 525) is applied, the plug 505 is not easily pulled out. At the center of the inside of the housing 501, the LED 510 for showing a power supply state from the rewriting terminal 70 (see FIG. 8) by an ON/OFF state is disposed so as to be visible from the through-hole 502b for confirmation. The LED 510 is fixed to the base plate 514.

Figure 22:
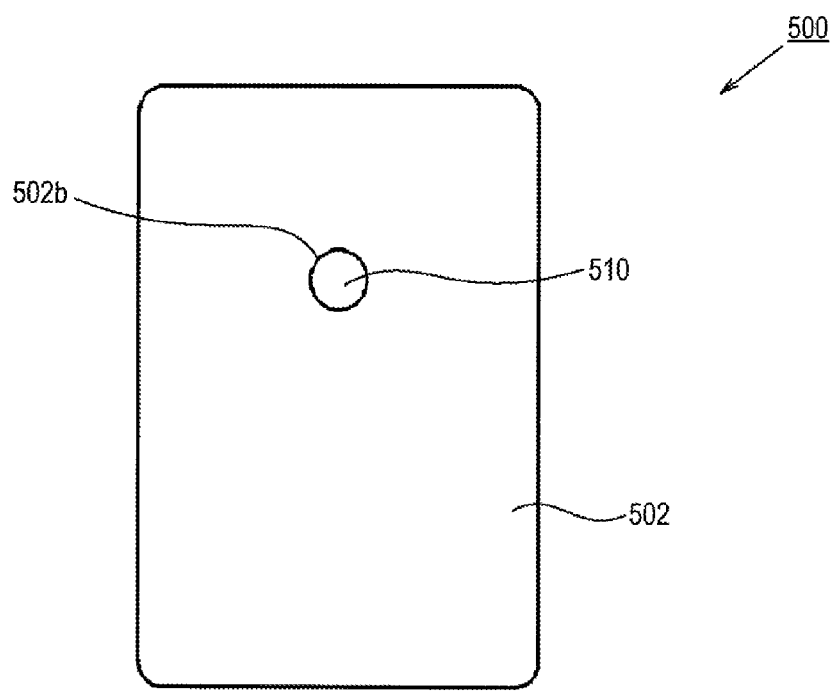
FIG. 22 is a rear view illustrating the communication plug 500 according to the ninth embodiment of the present invention.

FIG. 22 is a rear view illustrating the communication plug 500 according to the ninth embodiment of the present invention. At a portion of the housing cover 502 on the rear side of the housing 501, the LED 510 is provided. The LED 510 serves a power input display part for performing display representing that power is being input from the external device, and is disposed so as to be visible from the rear surface of the communication plug 500. Actually, the LED 510 is provided on the base plate 514, and is configured to be visible from the through-hole 502b formed at the housing cover 502.

Figure 23:
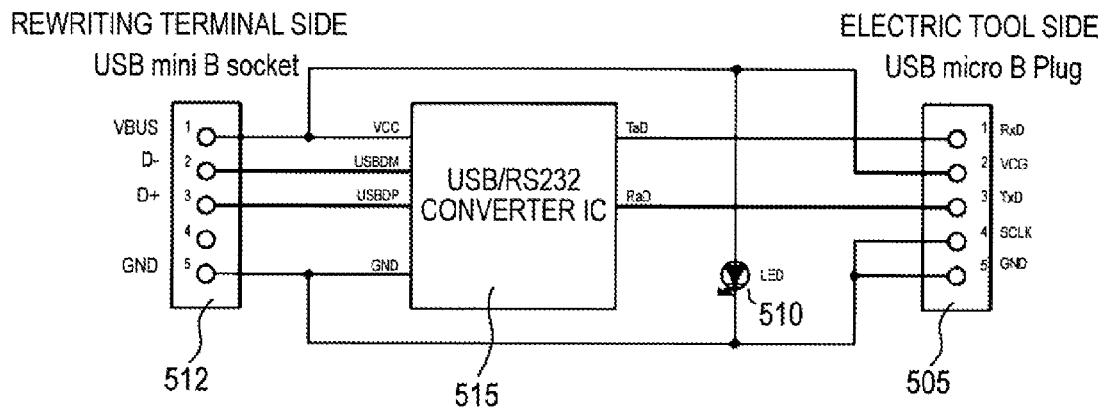
FIG. 23 is a schematic circuit diagram illustrating the communication plug 500 according to the ninth embodiment of the present invention.

FIG. 23 is a schematic circuit diagram illustrating the communication plug 500 according to the ninth embodiment of the present invention. This circuit is mounted on the base plate 514, and mainly includes a converter IC 515 for performing conversion between USB and RS232C protocols. The converter IC 515 can perform communication with the rewriting terminal 70 (see FIG. 8) according to a USB protocol and communication with the electric tool 1 according to an RS232C protocol. Further, in the present embodiment, since conversion is performed by the converter IC 515 and thus it is unnecessary to use the same protocol, other advantages can be obtained. For example, in the socket 512, a first terminal is connected to a plug power supply line; whereas, in the plug 505, a second pin is connected to the plug power supply line. Therefore, even if the worker prepares a commercial USB cable (in which an A plug corresponds to the rewriting terminal 70, and a micro B plug corresponds to the electric tool 1), and directly connects the rewriting terminal 70 and the electric tool 1 without the communication plug 500, positive power is not supplied to the first pin of the micro B plug, unlike the related art. Therefore, the micro computer 61 of the electric tool 1 is not activated, and thus the electric tool 1 makes no reaction. Therefore, as long as the communication plug 500 of the present embodiment is not prepared, information on the electric tool (1) side cannot be rewritten. As a result, it is possible to prevent an unexpected rewriting operation.

Figure 24:
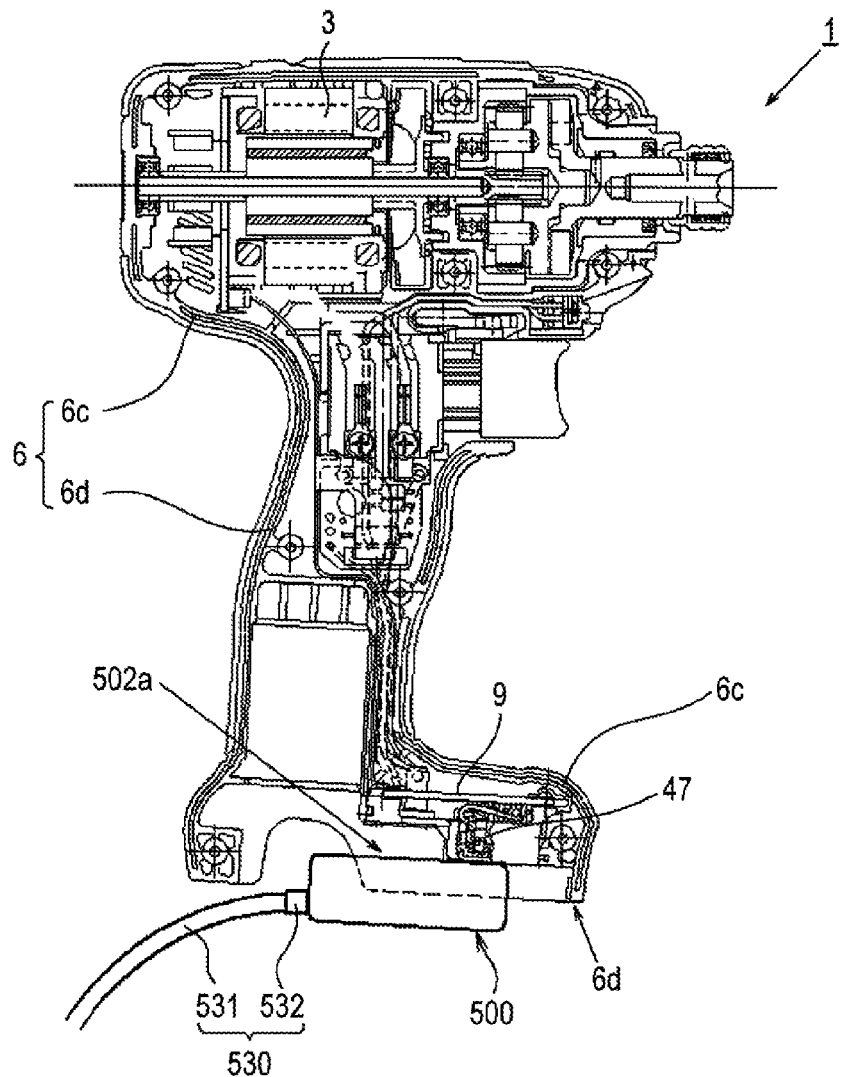
FIG. 24 is a longitudinal sectional view illustrating a connection state of the communication plug 500 with an electric tool 1.

FIG. 24 is a longitudinal sectional view illustrating a connection state of the communication plug 500 with the electric tool 1. When the communication plug 500 is mounted into the electric tool 1, the battery pack 2 is removed, the socket cover 46 (not shown in FIG. 24) (see FIG. 3) is opened, and the plug 505 of the communication plug 500 is inserted into the exposed socket 47b (see FIG. 4). In the present embodiment, in order to use USB mini or micro B socket and plug as the socket 47b and the plug 505, their mounting directions are determined in advance. Further, the communication plug 500 is shaped such that, when the communication plug 500 is brought in a correct direction into contact with the electric tool 1 as shown in FIG. 24, that is, when the communication plug 500 is mounted in a state in which the connection cable 530 extends on the rear side of the electric tool 1, the housing 6 of the electric tool 1 and the housing 501 of the communication plug 500 do not interfere with each other. Furthermore, the communication plug 500 is shaped such that, when the worker tires to bring the communication plug 500 in a wrong direction into contact with the electric tool 1, for example, an end portion 6d of the housing 6 and the vicinity of the label portion 502a of the communication plug 500 interfere with each other such that the communication plug 500 cannot be connected to the electric tool 1.

Figure 25:
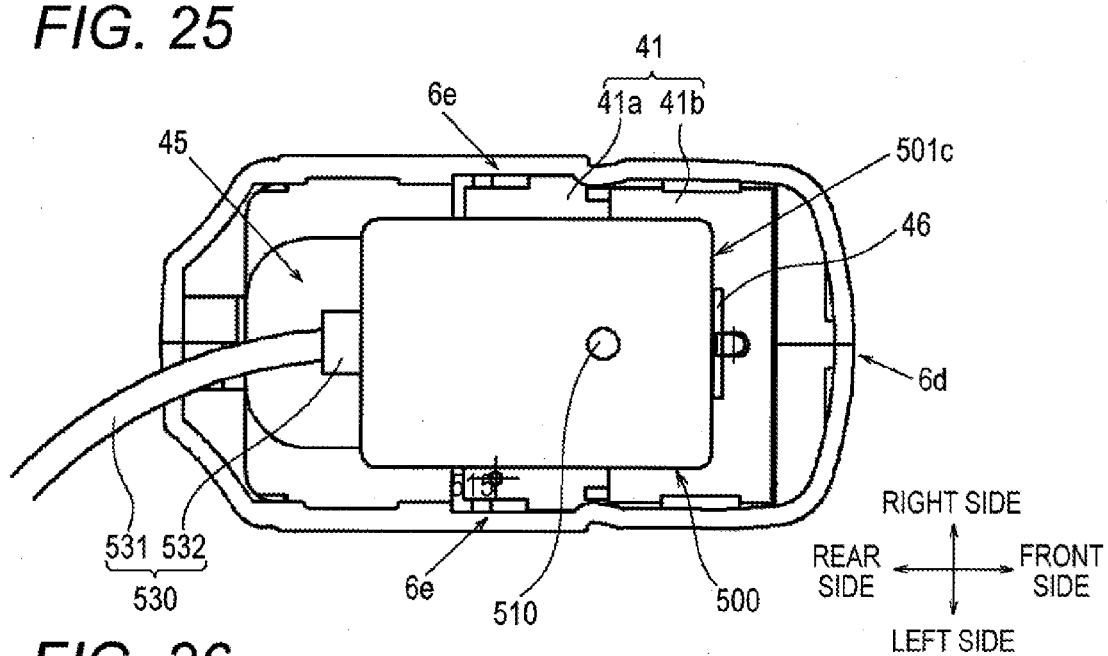
FIG. 25 is a bottom view illustrating the connection state of the communication plug 500 and the electric tool 1.

FIG. 25 is a bottom view illustrating the electric tool 1 of FIG. 24. The communication plug 500 is shaped such that, when the communication plug 500 is brought in the correct direction into contact with the electric tool 1, it does not interfere with any portion of the housing 6 and thus the plug 505 can be inserted into the socket 47b. Further, the socket cover 46 in an open state is positioned to be in contact with a small surface 501c of the communication plug 500, and thus does not inhibit the mounting of the communication plug 500. The base 41 is configured to include the two plate-shaped portions, i.e. a power supply terminal holding portion 41a for holding the three terminals, and the communication terminal holding portion 41b for accommodating the communication terminal 47, and the communication plug 500 is mounted such that the housing 501 is in close contact with the communication terminal holding portion 41b. The communication plug 500 is connected to the electric tool 1 such that the connection cable 530 extends on the rear side of the electric tool 1. This connection is performed by inserting the connector 532 of the connection cable 530 into the socket 512 of the communication plug 500. Although not shown, on the other end side of the connection cable 530, a USB A plug for connection with the rewriting terminal 70 is provided, and is connected to the rewriting terminal 70 (see FIG. 8) such as a personal computer.

If the connection cable 530 is connected to the rewriting terminal 70 such as a personal computer, power is supplied to the communication plug 500 and the electric tool 1 through the connection cable 530, such that the electronic circuit mounted on the base plate 514 and the micro computer 61 (see FIG. 8) of the electric tool 1 operate. Further, if power is supplied, since the LED 510 is turned on, the worker can easily identify that the electric tool 1 is accessible from the outside.

Figure 26:
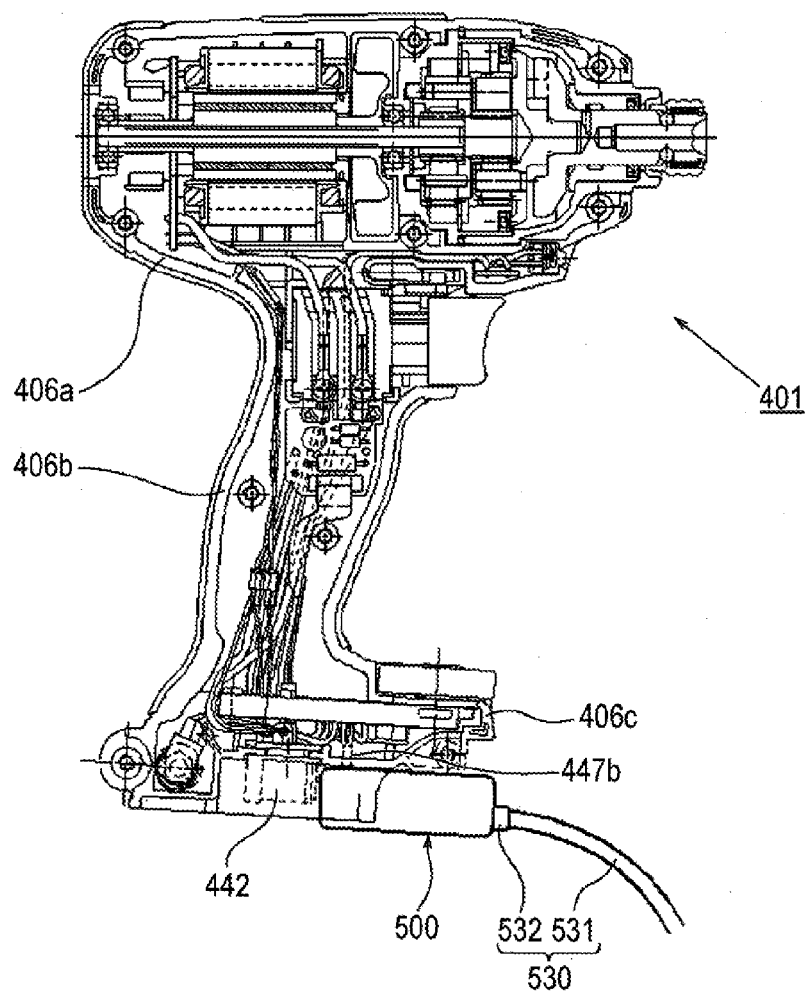
FIG. 26 is a longitudinal sectional view illustrating a connection state of the communication plug 500 with another electric tool 401.

FIG. 26 is a lateral view illustrating a connection state of the communication plug 500 and another type of electric tool 401. Since the electric tool 401 uses a battery pack (not shown) different from that of the electric tool 1, the shape of a battery attaching portion 406c of a housing 406 is different from the shape of the battery holding portion 6c, and the position of a terminal 442 for connection with the battery pack is also different from that of the electric tool 1. The plug 505 of the communication plug 500 is connected to a socket 447b, and the communication plug 500 is connected to the connection cable 530. In this case, the connection cable 530 is positioned to extend forward from the communication plug 500, and thus the battery pack and the connection terminal 442 do not interfere with each other. As described above, the communication plug 500 is shaped such that, when the communication plug 500 is brought in a correct direction into contact with the electric tool 401, it does not interfere with any portion of the housing 406 of the electric tool 401. Meanwhile, when the worker tries to mount the communication plug 500 into the electric tool 401 with its front-rear direction reversed (in a state in which the connection cable 530 extends backward from the communication plug 500), since the connection cable 530 interferes with the connection terminal 442, the worker can immediately recognize that the mounting direction is wrong. As described above, when the worker tries to bring the communication plug 500 in a wrong direction into contact with the electric tool 401, the communication plug 500 interferes with the housing of the electric tool 401. Therefore, it is possible to avoid wrong connection, and to prevent damage of the socket 447b and the plug 505.

Figure 27:
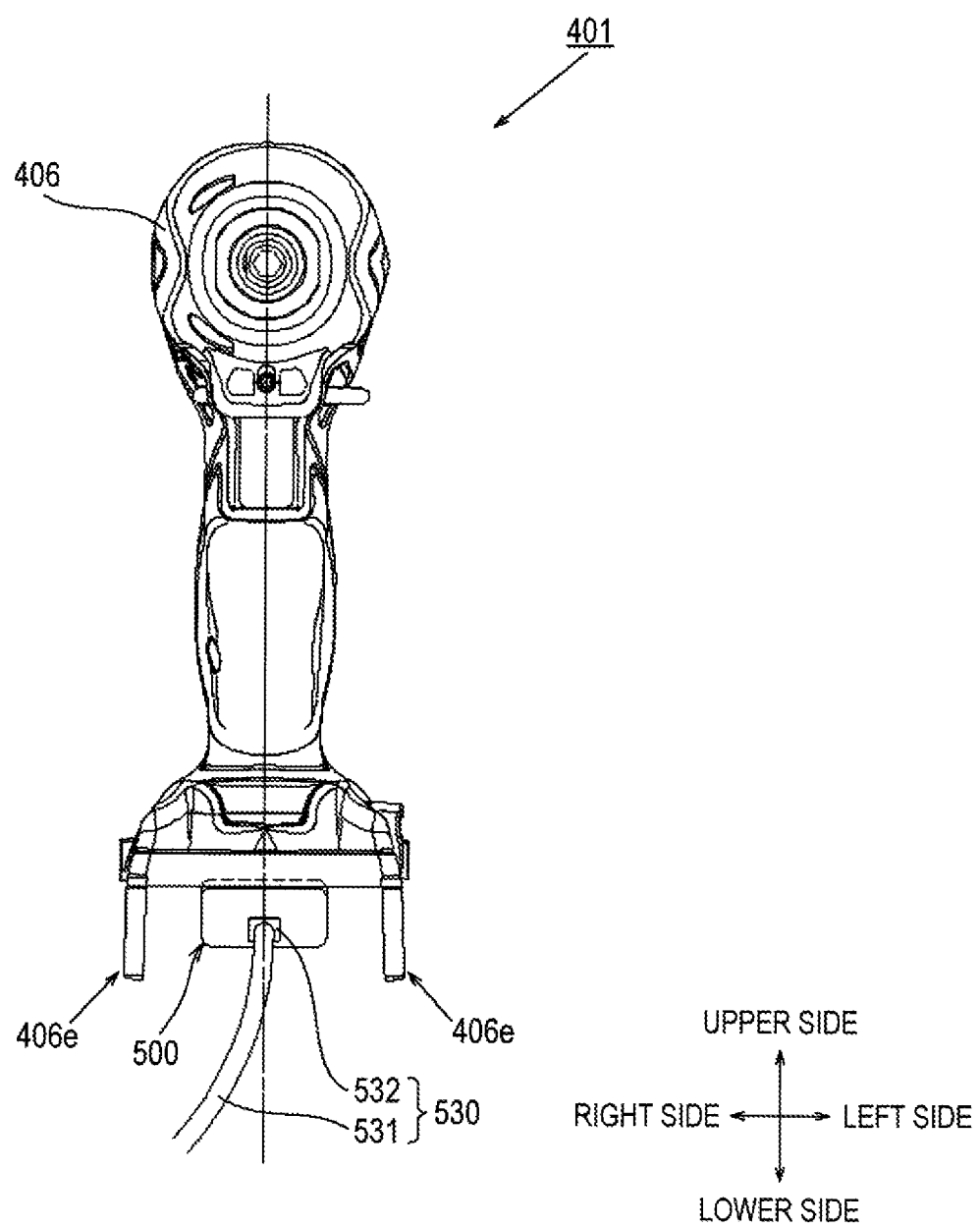
FIG. 27 is a front view illustrating the connection state of the communication plug 500 with the electric tool 401.

FIG. 27 is a front view illustrating the electric tool 401 of FIG. 26. The electric tool 401 has the substantially same function as that of the electric tool 1, and allows a battery pack (not shown), having a specification different from that of the battery pack 2, to be connected. The communication plug 500 is shaped such that, when the communication plug 500 is brought in the correct direction into contact with the electric tool 401, it does not interfere with the housing 406, particularly, a side wall portion 406e of the battery attaching portion. Further, the communication plug 500 is shaped such that when the worker tries to bring the communication plug 500 in a wrong direction into contact with the electric tool 401, the communication plug 500 interferes with the housing 406 of the electric tool 401 and thus cannot be connected to the electric tool 401. Furthermore, since the communication plug 500 is configured to be capable of being mounted into various other electric tools having a socket shape corresponding to the plug 505, the worker can use one communication plug 500 for connection of a plurality of electric tools.

Tenth Embodiment

Figure 28:
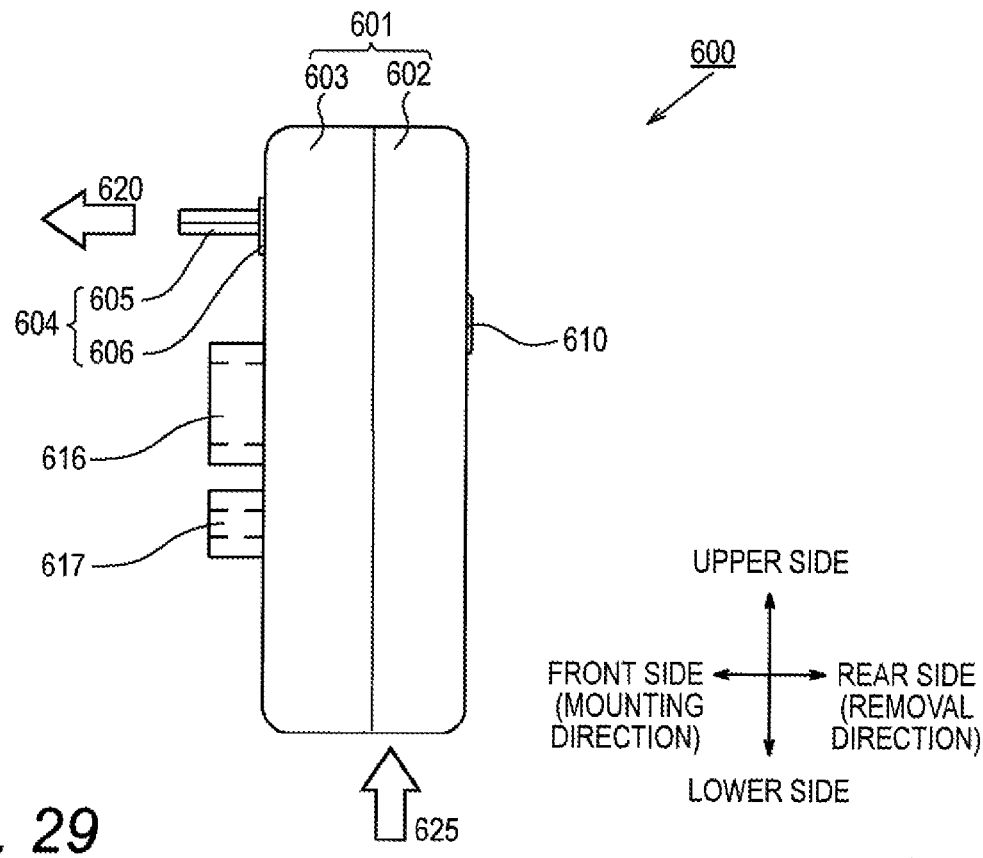
FIG. 28 is a lateral view illustrating a communication plug 600 according to a tenth embodiment of the present invention.

FIG. 28 is a lateral view illustrating a communication plug 600 according to a tenth embodiment of the present invention. The internal configuration of the communication plug 600 is basically the same as that of the communication plug 500. A communication terminal 604 protrudes from the largest surface of the communication plug 600. The communication terminal 604 is configured to include a plug 605 and a base portion 606, and the mounting direction of the plug 605 is the direction of an arrow 620. The connection cable 530 is mounted into the communication plug 600 in the direction of an arrow 625. In the present embodiment, at a portion of the outer wall of a base housing 603 of a housing 601, holding portions 616 to 618 (618 will be described below) for holding terminals for connection with the electric tool are formed. The holding portions 616 to 618 are configured to allow a plurality of electrode portions protruding from the electric tool 1, that is, the positive terminal 42, the LD terminal 43, and the negative terminal 44 shown in FIG. 7 to be fit into and covered by them when the communication plug 600 is brought in a correct direction into contact with the electric tool 1. Further, although the three electrode portions are used as holding subject portions in the present embodiment, the present invention is not limited thereto. The housing 6 or base 41 of the electric tool 1 may be formed in a convex shape to serve as holding subject portions. However, if the electrode portions for the battery are used, since it is unnecessary to newly prepare holding subject portions, it is possible to manufacture the electric tool with a simple structure at low cost.

At a housing cover 602 of the communication plug 600, an LED 610 is disposed to be visible. The LED 610 serves as a display part for performing display representing that power is being input to the communication plug 600. As described above, if a power input display part is provided to the communication plug 600, it is possible to easily confirm whether power is being input and the communication plug 600 is normally operating.

Figure 29:
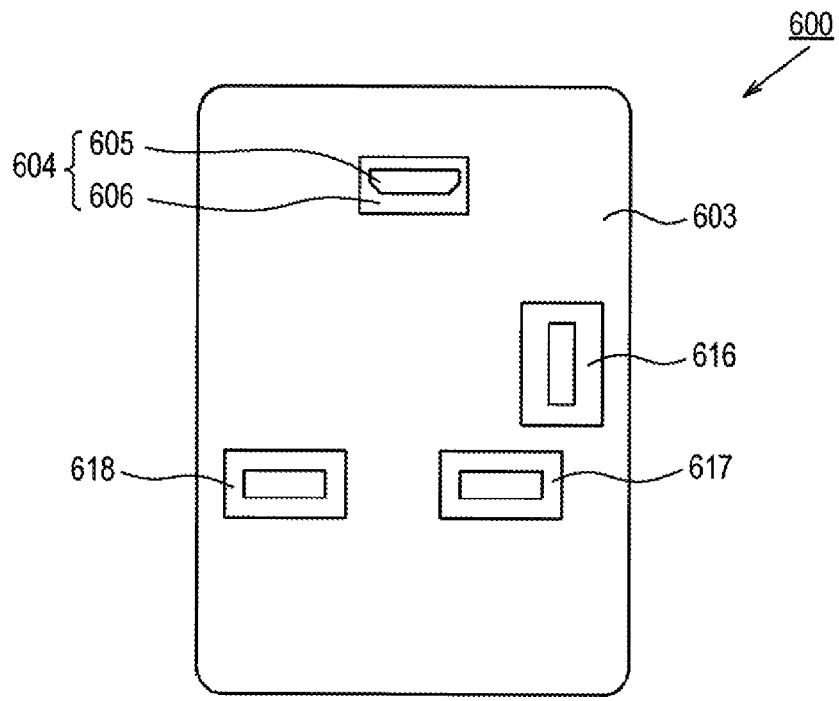
FIG. 29 is a front view illustrating the communication plug 600 according to the tenth embodiment of the present invention.

FIG. 29 is a front view illustrating the communication plug 600 of FIG. 28. A portion of the base housing 603 of the communication plug 600 serves as the holding portions 616 to 618, and the base housing 603 and the holding portions 616 to 618 are integrally formed of a synthetic resin such as plastic. When the communication plug 600 is brought in the correct direction into contact with the electric tool 1, the plurality of electrode portions protruding from the electric tool 1, i.e. the positive terminal 42, the LD terminal 43, and the negative terminal 44 are fit into the holding portions 616 to 618. As a result, the communication plug 600 is stably held by the electric tool 1. According to this configuration, since a load on the communication terminal 604 of the communication plug 600 is reduced, it is possible to implement a long lasting communication plug. Also, since the communication plug is prevented from coming in a wrong direction into contact with the electric tool, it is possible to implement a user-friendly communication plug. The holding portions 616 to 618 have internal hollows, have cylindrical shape protruding in a vertical direction from a surface of the base housing 603, and are formed of a non-conductive polymer resin, integrally with the base housing 603. During the mounting of the communication plug 600, the electrode portions are positioned inside the hollows. It is preferable to set the sizes of the hollows to be slightly larger than those of the electrode portions of the positive terminal 42, the LD terminal 43, and the negative terminal 44. If it is desired to make the communication plug 600 be more stably held, the internal shapes and materials of the holding portions may be set to positively hold the electrode portions.

As the communication terminal 604, a general-purpose terminal capable of securing a communication circuit corresponding to the socket 47b (see FIG. 6) of the electric tool 1 is used. In the present embodiment, a mini B plug or a micro B plug based on the USB standard corresponding to the socket 47b is used. Inside the communication plug 600, the same communication conversion part as the circuit shown in FIG. 23 is provided such that conversion between a communication signal corresponding to a communication transmission/reception part (not shown) such as a personal computer (PC) and a communication signal corresponding to the electric tool is performed, whereby communication is possible. The holding portions 616 to 618 are shaped such that, when the communication plug 600 is brought in the correct direction into contact with the electric tool 1, they do not interfere with the electrode portions of the electric tool 1. Further, the holding portions 616 to 618 are shaped such that, when the worker tries to bright the communication plug 600 in a wrong direction into contact with the electric tool 1, they interfere with the housing 6 of the electric tool 1, whereby connection of the communication plug 600 is impossible. As described above, in the present embodiment, the holding portions 616 to 618 and the positional relation between the housing 601 and the plug 605 serve as a connection direction limiting part.

As described above, according to the present embodiment, since the communication plug 600 has the connection direction limiting part, the communication plug 500 is prevented from coming in a wrong direction into contact with the electric tool, and it is possible to implement user-friendly communication plug and electric tool. Further, it is possible to prevent a breakdown of the plug 605 of the communication plug 600 or a breakdown of the control circuit board of the electric tool 1 due to the connection in a wrong direction.

Further, the shape of the communication plug 600 is not the same as the shape of the battery pack which is connected to the electric tool. This is to make it possible to easily determine which of the communication plug 600 and the battery pack is being mounted into the electric tool. If the shape of the communication plug 600 is small, the communication plug 600 can be connected even to sockets of electric tools to which battery packs having different specifications are connected. Like this, if it is possible to use the communication plug 600 for connection with a plurality of electric tools, it is possible to implement a more versatile communication plug.

Also, although the LED 610 capable of being turned on is used as the power input display part in the present embodiment, the present invention is not limited thereto. The power input display part may be configured by a known display method such as a liquid crystal display for displaying two states. However, as compared to the latter known method of displaying two states or the like, the former method of composing the power input display part of the LED capable of being turned on is advantageous in terms of cost, and is advantageous in that the configuration becomes easy and the cause of a breakdown is reduced.

Eleventh Embodiment

Figure 30:
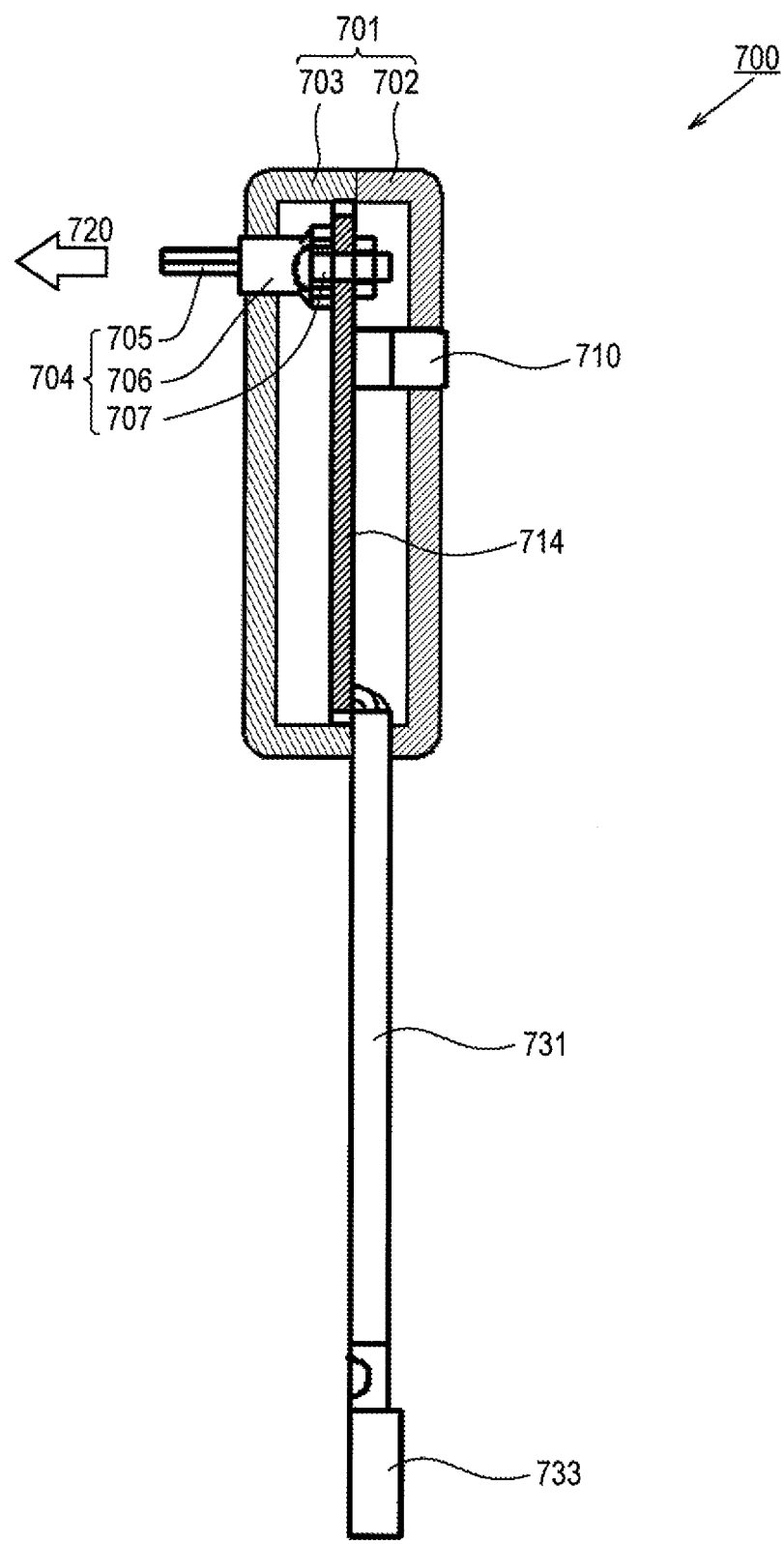
FIG. 30 is a longitudinal sectional view illustrating a communication plug 700 according to an eleventh embodiment of the present invention.

FIG. 30 is a longitudinal sectional view illustrating an entire structure of a communication plug 700 according to an eleventh embodiment of the present invention. The communication plug 700 is assembled by accommodating a base plate 714 in a base housing 703, and covering the base housing 703 with a housing cover 702. A plug 705 of the communication plug 700 is inserted into the communication terminal 47 (see FIG. 4) in the direction of an arrow 720. The plug 705 protrudes forward from the base housing 703, and a communication terminal 704 and an electronic circuit for communication protocol conversion are mounted on the base plate 714. The electronic circuit mounted on the base plate 714 is the same as the circuit shown in FIG. 23. In the present embodiment, a cable 731 is not connected to the base plate 714 through a socket and a plug, but is soldered directly on the base plate 714. At an end portion of the cable 731, a plug 733 such as a USB A plug for connection with the rewriting terminal 70 is provided. On the base plate 714, an LED 710 is provided as a means for performing display representing whether power is being input.

Figure 31:
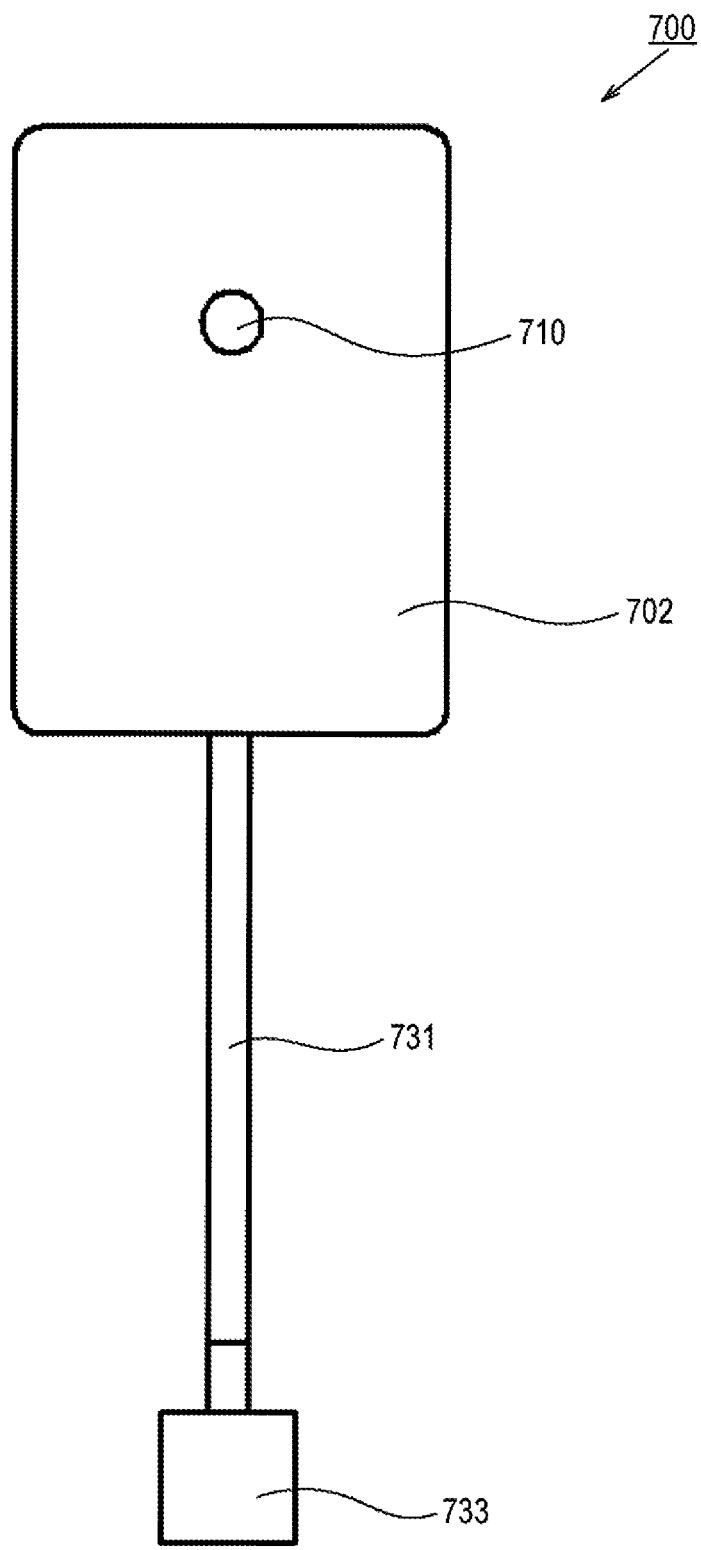
FIG. 31 is a rear view illustrating the communication plug 700 according to the eleventh embodiment of the present invention.

FIG. 31 is a rear view illustrating the communication plug 700 of FIG. 30. The LED 710 is disposed to be visible from a hole for confirmation prepared at the housing cover 702. As described above, in the eleventh embodiment, since the communication plug 700 and the cable 731 cannot be separated, a risk that the cable will be lost is reduced, and it becomes possible to reduce the cost of the communication plug 700.

Although the present invention has been described above on the basis of the embodiments, the present invention is not limited to the above-mentioned embodiments, but can be modified in various forms within the scope of the present invention. For example, in the above-mentioned embodiments, as an example of the electric tool, an impact driver is used. However, the present invention can be applied to not only the impact driver but also arbitrary electric tools which can be controlled using a micro computer and can be driven by batteries or commercial power supplies.

The present invention illustrative, non-limiting aspects as follows:

(1) In a first aspect, there is provided an electric tool including: a motor configured to drive a front end tool; a control device configure to control rotation of the motor; a storage part configured to store a method of driving the motor by the control device; and a communication terminal to which a communication line for reading or writing information of the storage part is configured to be connected.

According to the first aspect, the communication terminal for connecting the communication line for reading or writing the information of the storage part is provided. Therefore, after shipment from a factory, if necessary, an operation mode can be changed.

(2) In a second aspect, there is provided the electric tool according to the first aspect, wherein the control device includes a microprocessor, and wherein the method of driving the motor is determined according to at least one of a computer program and a control parameter stored in the storage part.

According to the second aspect, the method of driving the motor is determined according to at least one of the computer program and the control parameter stored in the storage part. In this case, it is possible to easily change the method of driving the motor only by changing the contents of the storage part from the external device through the communication terminal.

(3) In a third aspect, there is provided the electric tool according to the first aspect, further including: a housing that accommodates the motor; and a battery that is detachably fixed to the housing, wherein the housing includes a body portion that extends in a front-back direction, a handle portion that extends downward from the body portion, and a battery holding portion that is provided lower to the handle portion.

According to the third aspect, the battery is fixed to a portion of the housing below the handle portion. In this case, it is possible to implement an electric tool which is balanced in weight with respect to the handle portion.

(4) In a fourth aspect, there is provided the electric tool according to the third aspect, wherein the communication terminal is provided at the battery holding portion.

According to then fourth aspect, the communication terminal is provided at the battery holding portion. In this case, it is possible to place the communication terminal such that operability is good.

(5) In a fifth aspect, there is provided the electric tool according to the fourth aspect, wherein the communication terminal is provided at a portion which is exposed when the battery is removed from the battery holding portion, and wherein a connection cable is configured to be connected to the communication terminal when the battery is removed.

According to the fifth aspect, the communication terminal is provided at a portion which is exposed if the battery of the battery holding portion is removed. In this case, as long as the battery is not removed, it is impossible to connect the connection cable to the communication terminal. Therefore, it is possible to prevent a malfunction and to improve safety.

(6) In a sixth aspect, there is provided the electric tool according to the fifth aspect, wherein the battery holding portion accommodates a circuit board to which the control device is mounted, and wherein the communication terminal is connected to the circuit board.

According to the sixth aspect, the control device is mounted on the circuit board, which is accommodated in the battery holding portion, and the communication terminal is connected to the circuit board. In this case, it is possible to provide the communication terminal at a portion close to the control device. As a result, it is possible to suppress an increase in wire length according to expansion of the communication terminal.

(7) In a seventh aspect, there is provided the electric tool according to the third aspect, wherein the communication terminal is provided at the body portion.

According to the seventh aspect, the communication terminal is provided at the body portion of the housing. In this case, it is possible to implement a user-friendly electric tool in which a communication terminal is placed such that it is easily and visibly recognized.

(8) In an eighth aspect, there is provided the electric tool according to the third aspect, wherein the communication terminal is provided at the handle portion.

According to the eighth aspect, the communication terminal is provided at the handle portion. In this case, it is possible to implement a user-friendly electric tool in which a communication terminal is placed such that it is easily and visibly recognized.

(9) In a ninth aspect, there is provided the electric tool according to the fourth aspect, wherein a socket cover for closing the opening portion is provided at an opening portion of the communication terminal of the housing.

According to the ninth aspect, the socket cover for closing the opening portion is provided at the opening portion of the communication terminal of the housing. In this case, it is possible to prevent dust from coming into the communication terminal.

(10) In a tenth aspect, there is provided a communication plug connected to an electric tool including a control device, a storage part and a communication terminal for reading or writing information stored in the storage part from the outside, the communication plug including: a housing: a base plate that is mounted in the housing: a plug that is fixed to the base plate, protrudes outward from the housing, and is configured to be connected to the communication terminal; and a connection terminal for connecting the base plate and an external connection device, wherein the plug has a shape such that its connection direction is limited to a specific direction, and wherein a converter configured to perform conversion between a protocol for communication with the electric tool and a protocol for communication with the external connection device is provided to the base plate.

According to the tenth aspect, the communication plug includes the converter for conversion between the protocol for communication with the electric tool and the protocol for communication with the external connection device. Therefore, it is possible to use the communication plug to rewrite programs, various parameters, and the like of the electric tool from an external device such as a personal computer.

(11) In a eleventh aspect, there is provided the communication plug according to the tenth aspect, wherein the converter is configured to perform conversion between an RS232 protocol and a USB protocol.

According to the eleventh aspect, the converter performs conversion between an RS232C protocol and a USB protocol. In this case, it is possible to use the RS232C protocol for the electric tool and use the USB protocol for the personal computer, and it is also possible to use communication protocols in widespread use for each of the electric tool and the personal computer.

(12) In the twelfth aspect, there is provided the communication plug according to the tenth aspect, wherein the connection terminal is a socket which is attached to the base plate and to which a connection cable for connection with the external connection device is configured to be attached.

According to the twelfth aspect, the connection terminal is a socket for mounting the connection cable. In this case, it is possible to transfer or keep the communication protocols in a compact form in a state in which the connection cable is removed.

(13) In a thirteenth aspect, there is provided the communication plug according to the eleventh aspect, wherein the housing is substantially cuboid, wherein the plug protrudes in a perpendicular direction from the largest surface of the cuboid, and wherein the connection terminal is provided to the smallest surface of the cuboid.

In the thirteenth aspect, the housing is substantially cuboid, the plug protrudes in the perpendicular direction from the smallest surface of the cuboid, and the connection terminal is provided to the largest surface of the cuboid. In this case, it is possible to reduce the thickness of the communication plug in the perpendicular direction from the connection terminal Therefore, it is possible to implement a thin communication plug in which the thickness of the communication plug in the perpendicular direction from the connection terminal is not obstructive to the mounting.

(14) In a fourteenth aspect, there is provided the communication plug according to the eleventh aspect, wherein the connection terminal is a plurality of groups of terminals which are provided on the base plate and to which the connection cable is soldered, or a socket that is provided on the base plate.

According to the fourteenth aspect, the connection terminal is a plurality of groups of terminals which are provided on the base plate and to which the connection cable is soldered, or a socket that is provided on the base plate. In this case, it is possible to implement a communication plug which can be connected to the electric tool through a socket or directly.

(15) In a fifteenth aspect, there is provided the communication plug according to the tenth aspect, wherein the housing is configured in a shape such that, when the communication plug connects with the communication terminal which is exposed when a battery attached to the electric tool is removed, the housing does not interfere with a protruding portion of the electric tool.

According to the fifteenth aspect, the housing may be configured in a shape such that, when the communication plug is brought into contact with the communication terminal, the housing does not interfere with a protruding portion of the electric tool. In this case, it is possible to avoid a wrong connection of the communication plug, and to prevent a damage of a socket, a plug, and the like.

(16) In a sixteenth aspect, there is provided the communication plug according to the tenth aspect, wherein power for operating the control device is configured to be supplied from the external connection device to the electric tool.

According to the sixteenth aspect, power for activating the control device is supplied from the outside. In this case, in a state in which the battery is removed, it is possible to perform communication with the electric tool.

(17) In a seventeenth aspect, there is provided the communication plug according to claim 16, further including: a display part configured to display a communication situation representing whether the power is being supplied.

According to the seventeenth aspect, the display part that displays the communication situation representing whether power is being supplied to the communication plug may be provided. In this case, a worker can easily confirm whether power is being input and the communication plug is correctly operating.

(18) In an eighteenth aspect, there is provided the communication plug according to the seventeenth aspect, wherein the housing includes a connection direction limiting part that is configured to limit the communication plug such that the communication plug is attached to the electric tool in a correct direction.

According to the eighteenth aspect, the connection direction limiting part that is configured to limit the communication plug such that the communication plug is attached to the electric tool in a correct direction is provided in the housing. In this case, it is possible to easily mount the communication plug in the correct direction.

(19) In a nineteenth aspect, there is provided an electric tool including: a control device; a storage part; and a USB connector for reading or writing information from an external personal computer, wherein the control device can be operated by power supplied from the personal computer through the USB connector, wherein the USB connector and the control device are connected such that a power supply line is disposed to supply power to a signal pin different from that for a USB protocol, and wherein the control device operates by the supplied power when the control device is connected to the personal computer.

According to the nineteenth aspect, in the electric tool including the USB connector, the USB cable and the control device are connected such that a power supply line is disposed to supply power to a signal pin different from that for a USB protocol. Therefore, it is possible to implement a safe electric tool capable of preventing the electric tool from operating when the electric tool and the personal computer are directly connected by a general USB cable.

(20) According to a twentieth aspect, there is provided the electric tool according to the nineteenth aspect, wherein the electric tool is of a cordless type which is configured to be operated by a detachable battery pack, and wherein the USB connector is provided at a position which is accessible only when the battery is removed.

According to the twentieth aspect, the USB connector is provided at a position which is accessible only when the battery is removed. In this case, it is possible to implement a safe electric tool capable of preventing the motor of the electric tool from rotating during connection of the USB connector.

What is claimed is:
1. An electric tool comprising:
a motor configured to drive a front end tool;
a control device configured to control rotation of the motor;
a communication terminal to which a communication line from exterior is configured to be connected, the communication terminal being connected to the control device;
a housing that accommodates the motor, and includes a battery holding portion;
a pair of connecting terminals provided at the battery holding portion and provided separately from the communication terminal; and
a battery that is configured to be detachably fixed to the battery holding portion and is configured to be electrically connected to the pair of connecting terminals when the battery is fixed to the housing,
wherein the communication terminal is provided at the battery holding portion, and
wherein the communication terminal is not connected to the battery when the battery is fixed to the housing.

2. The electric tool according to claim 1, further comprising a storage part configured to store a method of driving the motor by the control device,
wherein the control device includes a microprocessor, and
wherein the method of driving the motor is determined according to at least one of a computer program and a control parameter stored in the storage part.

3. The electric tool according to claim 1, wherein the communication terminal is provided at a portion which is exposed when the battery is removed from the battery holding portion, and
wherein a connection cable is configured to be connected to the communication terminal when the battery is removed.

4. The electric tool according to claim 3, wherein the battery holding portion accommodates a circuit board to which the control device is mounted, and
wherein the communication terminal is connected to the circuit board.

5. The electric tool according to claim 1, wherein a socket cover for closing an opening portion is provided at the opening portion of the communication terminal of the housing.

6. The electric tool according to claim 1, wherein the communication terminal is connected to the control device.

7. The electric tool according to claim 1, wherein the communication terminal is configured to be connected to a device other than the battery,
wherein when the battery is fixed to the battery holding portion, the battery covers the communication terminal to disable the communication terminal from being connected to the device other than the battery.

8. An electric tool comprising:
a motor configured to drive a front end tool;
a control device configured to control rotation of the motor;

a communication terminal to which a communication line from exterior is configured to be connected, the communication terminal being connected to the control device;

a housing that accommodates the motor;

a pair of connecting terminals provided at the battery holding portion and provided separately from the communication terminal; and a battery that is configured to be detachably fixed to the housing and is configured to be electrically connected to the pair of connecting terminals when the battery is fixed to the housing, wherein the housing includes a body portion that extends in a front-back direction, a handle portion that extends downward from the body portion in a downward direction, and a battery holding portion that is provided lower to the handle portion, the housing being divided into two members in a lateral direction which crosses the front-back direction and the downward direction, wherein the communication terminal is provided at a divided surface of the two members of the body portion and a pair of connecting terminals of the battery are provided separately from the communication terminal; and wherein the communication terminal is not connected to the battery when the battery is fixed to the housing.

9. The electric tool according to claim 8, wherein a socket cover for closing an opening portion is provided at the opening portion of the communication terminal of the housing.

10. The electric tool according to claim 8, further comprising a storage part configured to store a method of driving the motor by the control device, wherein the control device includes a microprocessor, wherein the method of driving the motor is determined according to at least one of a computer program and a control parameter stored in the storage part.

11. The electric tool according to claim 8, wherein the communication terminal is connected to the control device.

12. An electric tool comprising:

a motor configured to drive a front end tool;

a control device configured to control rotation of the motor;

a communication terminal to which a communication line from exterior is configured to be connected, the communication terminal being connected to the control device;

a housing that accommodates the motor;

a pair of connecting terminals provided at the battery holding portion and provided separately from the communication terminal; and a battery that is configured to be detachably fixed to the housing and is configured to be electrically connected to the pair of connecting terminals when the battery is fixed to the housing, wherein the housing includes a body portion that extends in a front-back direction, a handle portion that extends downward from the body portion in a downward direction, and a battery holding portion that is provided lower to the handle portion, the housing being divided into two members in a lateral direction which crosses the front-back direction and the downward direction, wherein the communication terminal is provided at an outer surface of one of the two members of the handle portion and a pair of connecting terminals of the battery are provided separately from the communication terminal; and wherein the communication terminal is not connected to the battery when the battery is fixed to the housing.

13. The electric tool according to claim 12, wherein a socket cover for closing an opening portion is provided at the opening portion of the communication terminal of the housing.

14. The electric tool according to claim 12, further comprising a storage part configured to store a method of driving the motor by the control device, wherein the control device includes a microprocessor, wherein the method of driving the motor is determined according to at least one of a computer program and a control parameter stored in the storage part.

15. The electric tool according to claim 12, wherein the communication terminal is connected to the control device.

* * * * *